United States Patent
Rozint

(10) Patent No.: US 11,462,061 B2
(45) Date of Patent: Oct. 4, 2022

(54) SYSTEMS AND METHODS FOR USE OF DIAGNOSTIC SCAN TOOL IN AUTOMOTIVE COLLISION REPAIR

(71) Applicant: Mitchell International, Inc., San Diego, CA (US)

(72) Inventor: John Joseph Rozint, Huntington Beach, CA (US)

(73) Assignee: Mitchell International, Inc., San Diego, CA (US)

( * ) Notice: Subject to any disclaimer, the term of this patent is extended or adjusted under 35 U.S.C. 154(b) by 311 days.

(21) Appl. No.: 16/676,576

(22) Filed: Nov. 7, 2019

(65) Prior Publication Data

US 2020/0074768 A1 Mar. 5, 2020

Related U.S. Application Data

(60) Continuation of application No. 16/005,534, filed on Jun. 11, 2018, now Pat. No. 11,151,812, which is a
(Continued)

(51) Int. Cl.
*G07C 5/08* (2006.01)
*G06Q 10/00* (2012.01)
(Continued)

(52) U.S. Cl.
CPC ............. *G07C 5/085* (2013.01); *G06Q 10/20* (2013.01); *G06Q 30/04* (2013.01); *G07C 5/008* (2013.01);
(Continued)

(58) Field of Classification Search
None
See application file for complete search history.

(56) References Cited

U.S. PATENT DOCUMENTS

| 5,446,659 A | 8/1995 | Yamawaki |
| 6,370,454 B1 | 4/2002 | Moore |

(Continued)

FOREIGN PATENT DOCUMENTS

| CN | 201010584098 | 12/2010 |
| WO | WO 2017174245 A1 | 10/2017 |
| WO | WO 2017184715 A1 | 10/2017 |

OTHER PUBLICATIONS

Bosch, OTC Encore at a Glance, brochure, Feb. 2017.
(Continued)

*Primary Examiner* — Thomas E Worden

(57) ABSTRACT

A new automotive collision repair technology is provided, including system and data flow architectures that are designed to provide enhanced data and enhanced data flow in the context of vehicle diagnosis and repair, particularly when repairs are necessary due to collisions. In some examples, the data flow through the network is streamlined, to avoid network congestion, to use fewer computer and network resources and/or to enable the utilization of smaller databases. In other examples, enhanced access to data in real-time and near real-time enabled by a Workflow Module supports more accurate and timely decision on vehicle repair. An advantage of this new automotive collision repair technology is that it enables proper and proven repairs, which in turn increases operation safety of repaired vehicle and people safety.

14 Claims, 15 Drawing Sheets

Related U.S. Application Data division of application No. 15/487,379, filed on Apr. 13, 2017, now Pat. No. 10,152,836.

(60) Provisional application No. 62/324,826, filed on Apr. 19, 2016.

(51) Int. Cl.
  *G06Q 30/04* (2012.01)
  *G07C 5/00* (2006.01)

(52) U.S. Cl.
  CPC ....... *G07C 5/0808* (2013.01); *G07C 2205/02* (2013.01)

(56) References Cited

U.S. PATENT DOCUMENTS

| | | | |
|---|---|---|---|
| 6,381,561 B1 | 4/2002 | Bomar, Jr. et al. | |
| 6,650,949 B1 | 11/2003 | Fera | |
| 6,959,235 B1 | 10/2005 | Abdel-Malek | |
| 7,197,444 B2 | 3/2007 | Bomar, Jr. et al. | |
| 7,502,772 B2 | 3/2009 | Kidd et al. | |
| 7,698,086 B2 | 4/2010 | Kidd et al. | |
| 8,019,629 B1 | 9/2011 | Medina, III et al. | |
| 8,160,904 B1 | 4/2012 | Smith | |
| 8,260,639 B1 | 9/2012 | Medina, III et al. | |
| 8,346,411 B1 | 1/2013 | Dirks | |
| 8,612,170 B2 | 12/2013 | Smith et al. | |
| 8,712,806 B1 | 4/2014 | Medina, III et al. | |
| 9,218,626 B1 | 12/2015 | Haller, Jr. et al. | |
| 9,500,545 B2 | 11/2016 | Smith et al. | |
| 9,715,711 B1 | 7/2017 | Konrardy | |
| 9,721,400 B1 | 8/2017 | Oakes, III et al. | |
| 9,773,281 B1 | 9/2017 | Hanson | |
| 9,846,093 B2 | 12/2017 | Smith | |
| 10,024,684 B2 | 7/2018 | Wang | |
| 10,319,035 B2 | 6/2019 | Nelson et al. | |
| 10,339,728 B1 | 7/2019 | Oakes, III et al. | |
| 10,410,439 B1 | 9/2019 | Gingrich et al. | |
| 10,510,142 B1 | 12/2019 | Dohner et al. | |
| 10,922,726 B1 | 2/2021 | Nelson et al. | |
| 10,949,814 B1 | 3/2021 | Nelson et al. | |
| 2002/0016655 A1 | 2/2002 | Joao | |
| 2002/0138185 A1 | 9/2002 | Trsar | |
| 2004/0230498 A1 | 11/2004 | Zimmerman | |
| 2005/0021197 A1 | 1/2005 | Zimmerman | |
| 2005/0143882 A1 | 6/2005 | Umezawa | |
| 2006/0271246 A1 | 11/2006 | Bell | |
| 2007/0173993 A1 | 7/2007 | Nielsen | |
| 2007/0202857 A1 | 8/2007 | Hara | |
| 2008/0004764 A1 | 1/2008 | Chinnadurai | |
| 2008/0250196 A1 | 10/2008 | Mori | |
| 2008/0319665 A1 | 12/2008 | Berkobin | |
| 2010/0256863 A1 | 10/2010 | Nielsen | |
| 2010/0318258 A1 | 12/2010 | Katayama | |
| 2010/0324376 A1 | 12/2010 | Chinnadurai | |
| 2011/0130906 A1 | 6/2011 | Mayer | |
| 2011/0130916 A1 | 6/2011 | Mayer | |
| 2012/0021386 A1 | 1/2012 | Anderson | |
| 2012/0029759 A1 | 2/2012 | Suh | |
| 2012/0041637 A1 | 2/2012 | Allemang | |
| 2013/0268156 A1 | 10/2013 | Schumann | |
| 2013/0282228 A1 | 10/2013 | Cawse | |
| 2013/0332004 A1 | 12/2013 | Gompert | |
| 2014/0122130 A1 | 5/2014 | Kelly et al. | |
| 2015/0039177 A1 | 2/2015 | Chapman | |
| 2015/0039397 A1 | 2/2015 | Fuchs | |
| 2015/0317243 A1* | 11/2015 | Green | G06F 11/3688 714/38.1 |
| 2015/0371458 A1 | 12/2015 | Scott | |
| 2016/0049018 A1 | 2/2016 | Gro | |
| 2016/0063776 A1 | 3/2016 | Chronowski | |
| 2016/0071333 A1 | 3/2016 | Haidar | |
| 2016/0078695 A1 | 3/2016 | McClintic | |
| 2016/0086397 A1 | 3/2016 | Phillips | |
| 2016/0110934 A1 | 4/2016 | Ernst | |
| 2016/0178465 A1 | 6/2016 | Smith et al. | |
| 2016/0257415 A1 | 9/2016 | Ye | |
| 2016/0300402 A1 | 10/2016 | Nassar | |
| 2016/0328890 A1* | 11/2016 | Keane | G07C 5/0808 |
| 2016/0330284 A1 | 11/2016 | Holck | |
| 2017/0041737 A1 | 2/2017 | Fischer | |
| 2017/0053460 A1 | 2/2017 | Hauser | |
| 2017/0069144 A1 | 3/2017 | Lawrie-Fussey | |
| 2017/0200359 A1 | 7/2017 | Gregg | |
| 2017/0301154 A1 | 10/2017 | Rozint | |
| 2018/0225341 A1 | 8/2018 | Merg | |
| 2018/0293813 A1 | 10/2018 | Rozint | |
| 2018/0300576 A1 | 10/2018 | Dalyac | |
| 2020/0223385 A1* | 7/2020 | Brozovich | G07C 5/0808 |
| 2020/0334927 A1* | 10/2020 | Rozint | G07C 5/0808 |
| 2021/0097503 A1* | 4/2021 | Rozint | G06Q 10/20 |

OTHER PUBLICATIONS

Bosch, OTC Diagnostics for Life, brochure.
Bosch, OTC Introducing OTC 3896 Evolve Powered by Bosche, brochure.
Maxisys, Vehicle Diagnostic Report, report, Jun. 2017.
Air Pro Diagnostics, website found at www.airprodiagnostics.com.
Office Action in Canadian Patent Application No. 3092411, dated Sep. 1, 2021.

* cited by examiner

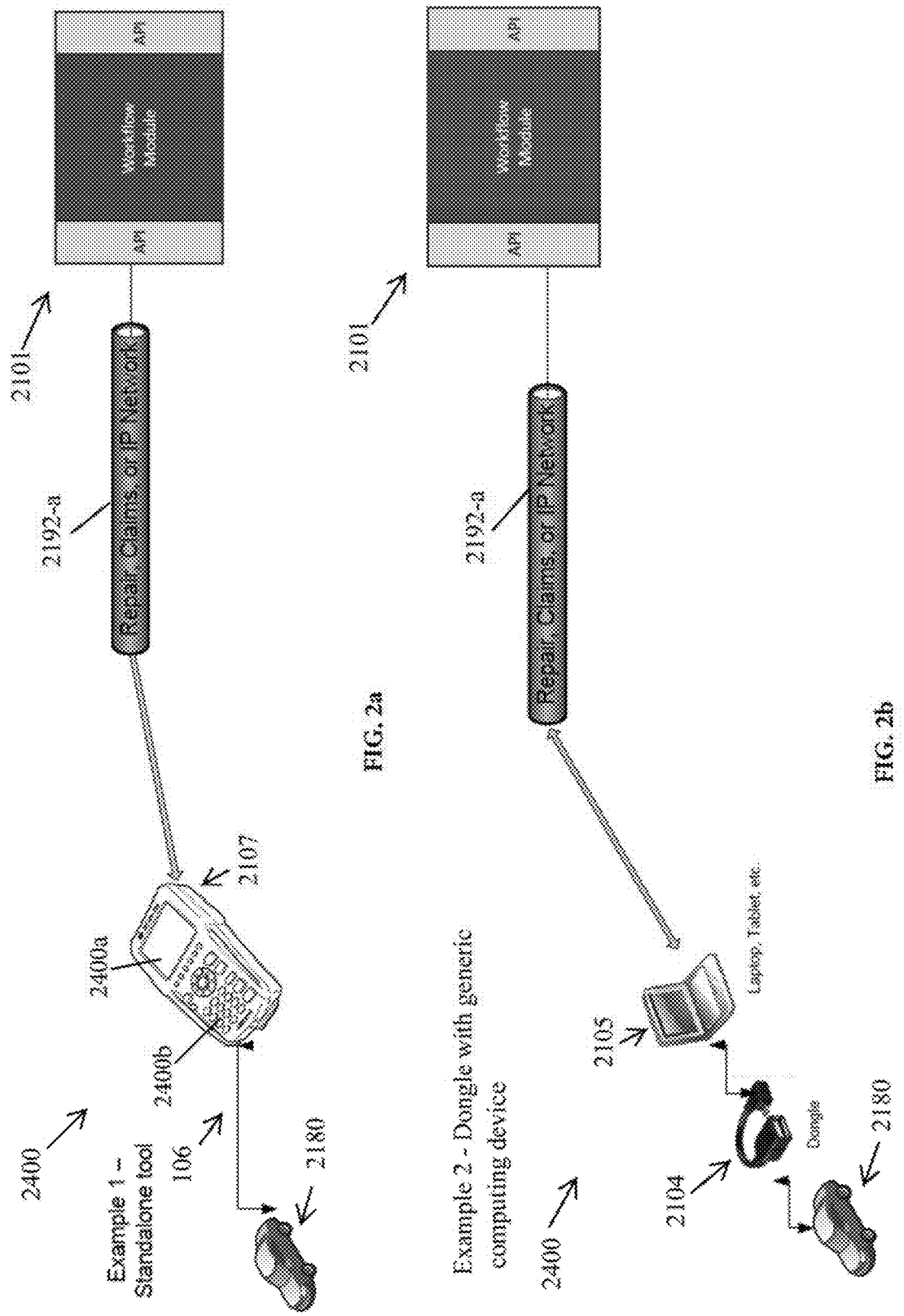

SYSTEMS AND METHODS FOR USE OF DIAGNOSTIC SCAN TOOL IN AUTOMOTIVE COLLISION REPAIR

This application is a continuation of U.S. application Ser. No. 16/005,534, filed Jun. 11, 2018, which is a divisional of U.S. application Ser. No. 15/487,379, filed Apr. 13, 2017, now U.S. Pat. No. 10,152,836, which claims the benefit of U.S. Provisional Application No. 62/324,826, filed Apr. 19, 2016, which are hereby incorporated by reference, to the extent that they are not conflicting with the present application.

FIELD

The invention relates generally to automobiles and more specifically to automotive collision repair technology.

BACKGROUND

Automotive systems are increasingly based on computerized modules that utilize and generate diagnostic data. The proliferation of computerized vehicle systems has led to a situation where a collision repair may often require reset, replacement or reprogramming of computerized modules during the repair process. For example, airbag systems are tied to seat weight sensors, blind spot cameras are embedded in side view mirrors, and rear backup warning systems are embedded in bumpers. There are many more examples that impact collision repairs and the number is growing.

Due to the increasing use of computerized and automated vehicle systems, it is increasingly necessary to utilize diagnostic scan tools and equipment and to process and exchange diagnostic repair data, as well as repair procedure data, reliably and efficiently, often in real time, in order to correctly and safely return collision damaged vehicles to pre-accident function and appearance.

Further, the collision repair organization (repair shop) needs to reliably secure and provide diagnostic repair data regarding which of the vehicle systems were accessed and repaired during the repair process in order to prove that the vehicle was repaired properly and returned to pre-accident condition, and is thus safe to operate. In addition, the reliable diagnostic repair documentation can be used to support billing and collection for such reliably proven diagnostic repairs from the automotive insurer, fleet manager, third party administrator, or the vehicle owner.

Use of just a scan tool alone produces no proof that safety systems such as lane departure and blind spot monitoring systems were properly recalibrated (or recalibrated at all). To prove that safe and proper repairs were performed and to prevent or reduce errors and/or fraud, systems and processes that reliably and efficiently secure and provide diagnostic repair data regarding these critical procedures are needed.

The existing scan tools, systems and processes do not appear to be capable of solving the problems and/or meeting the needs outlined above, efficiently and reliably.

Therefore, a need exists for novel diagnostic tool, systems and methods that enable the collision repairer to correctly repair the vehicle and to document the systems accessed and the repairs completed in order to prove that the vehicle can be safely returned to use; and, in addition, to support related processes such as billing, insurance claims, fleet management, third party administration, and so on, for the reliably proven diagnostic repairs.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In some aspects, system and data flow architectures are provided that are designed to provide enhanced data and enhanced data flow in the context of vehicle diagnosis and repair, particularly when repairs are necessary due to collisions. In some examples, the data flow through the network is streamlined, to avoid network congestion, to use fewer computer and network resources and/or to enable the utilization of smaller databases. In other examples, enhanced access to data in real-time and near real-time enabled by a Workflow Module supports more accurate and timely decisions on vehicle repair. An advantage of this new automotive collision repair technology is that it enables proper and proven repairs, which in turns increases vehicle and people safety. An additional advantage is that it enables improved repair facility billing processes, and streamlined claims processing.

In an aspect, new automotive collision repair technology, including a novel system and method for accessing, processing and managing of automotive diagnostic data in the automotive collision repair, is provided. In an example, the system may include three components: (1) an enhanced diagnostic scan tool to access and process vehicle data ("New Tool"); (2) a software system that captures diagnostic data, system status, and repair operations to enable correct real-time and near real-time repair decisions, and thus safe repairs ("Workflow Module"); and (3) an integration module ("New API") that allows data exchange with other collision repair systems, to further increase the reliability of the repairs.

The disclosed automotive collision repair technology allows for seamless data transmission throughout the automotive claims and automotive collision repair process, including direct integration with the enhanced scan tool that connects to the vehicle. The result is faster and more importantly more accurate, thus safe and reliable vehicle repair, proven by improved repair documentation, including improved ability for the repairer to document repairs and diagnostic scanning procedures, while using fewer system resources.

As an example, the Workflow Module provides repair procedures in real time and produces a log that documents in real time critical diagnostic repair procedures. Thus, some of the benefits of the systems and associated processes disclosed herein are safe, reliable and proven repairs and the prevention or reduction of errors and/or fraud in automotive collision repairs.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 2a illustrates an example of a standalone diagnostic scan tool used as an active node in the computer networks from FIGS. 1 and 5-6, according to an aspect.

FIG. 2b illustrates another example of a diagnostic scan tool used as an active node in the computer networks from FIGS. 1 and 5-6, according to an aspect.

DETAILED DESCRIPTION

Figure 1:
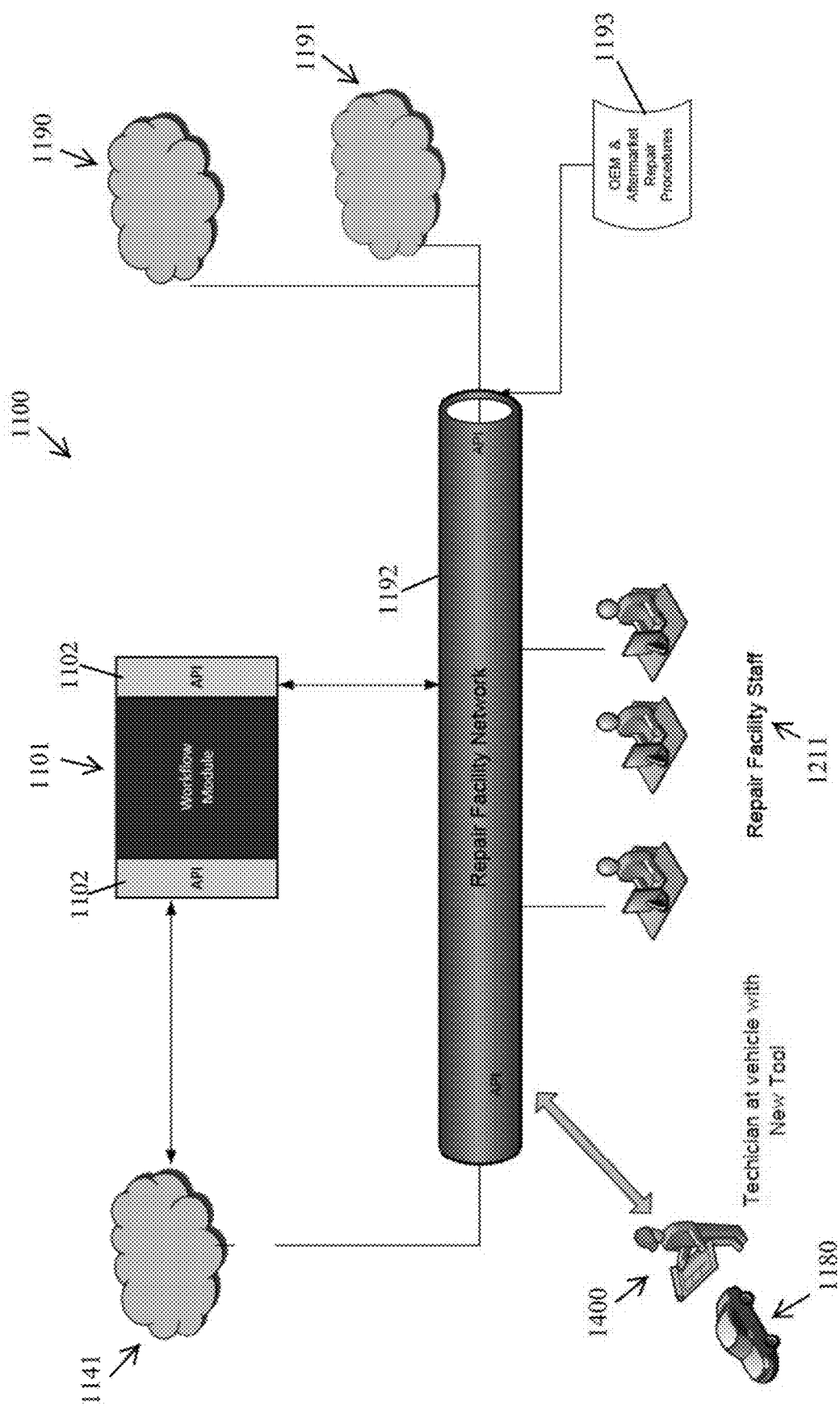
FIG. 1 and FIGS. 5-6 illustrate examples of system (computer network) architectures and of diagnostic and repair data flow architectures, according to several aspects.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 1101 and 5101, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network.

As used herein, the term "Diagnostic Data" generally means information stored in electronic format on vehicle electronic systems, communicated on the vehicle bus, and used by vehicle systems and by technicians to repair vehicle systems.

"Repair Procedure Data" refers to published guides to proper methods to repair the vehicle and may be published by the vehicle manufacturer ("OEM") or by other Aftermarket data suppliers. "Repair Log Data" refers to information related to the procedures or operations completed and time spent in the vehicle repair process and may include date and time stamped entries of start and completion times for various aspects of the vehicle repair.

As used herein, the term "Technician" means a person such as employee of an automobile collision repair facility that performs vehicle repairs, or it may be another person involved in the vehicle damage assessment process such as an Independent Appraiser or an Insurance Adjuster. As used herein, the term "Interface" means the transfer of electronic information between or among various computing applications and devices. As used herein, the term "Standardized Transactions" means data organized in a standard format as defined either by a standards committee (such as CIECA or ANSI), or an industry accepted standard format for data storage (such as Comma Separated Values, "CSV").

Figure 5:
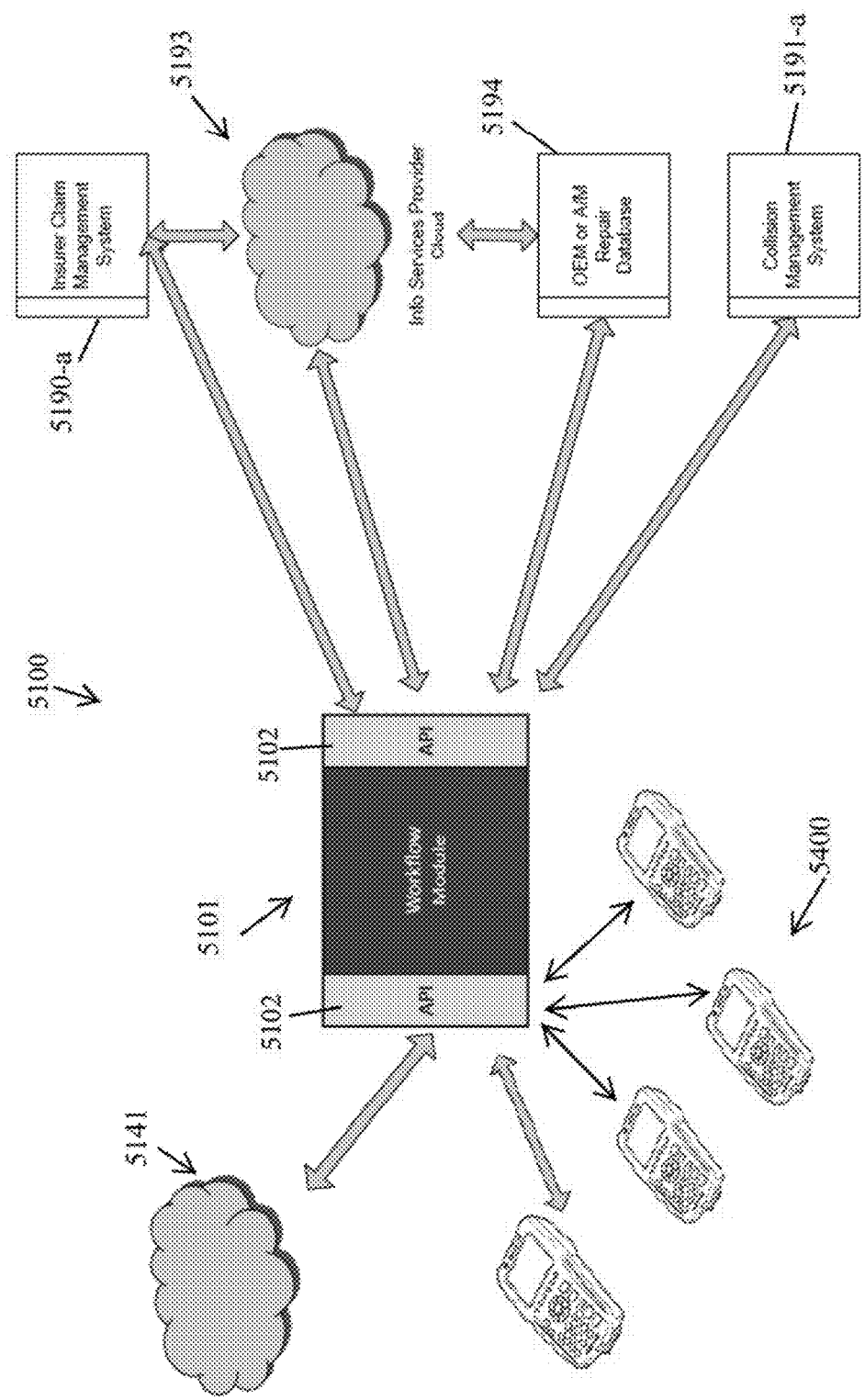
Figure 6:
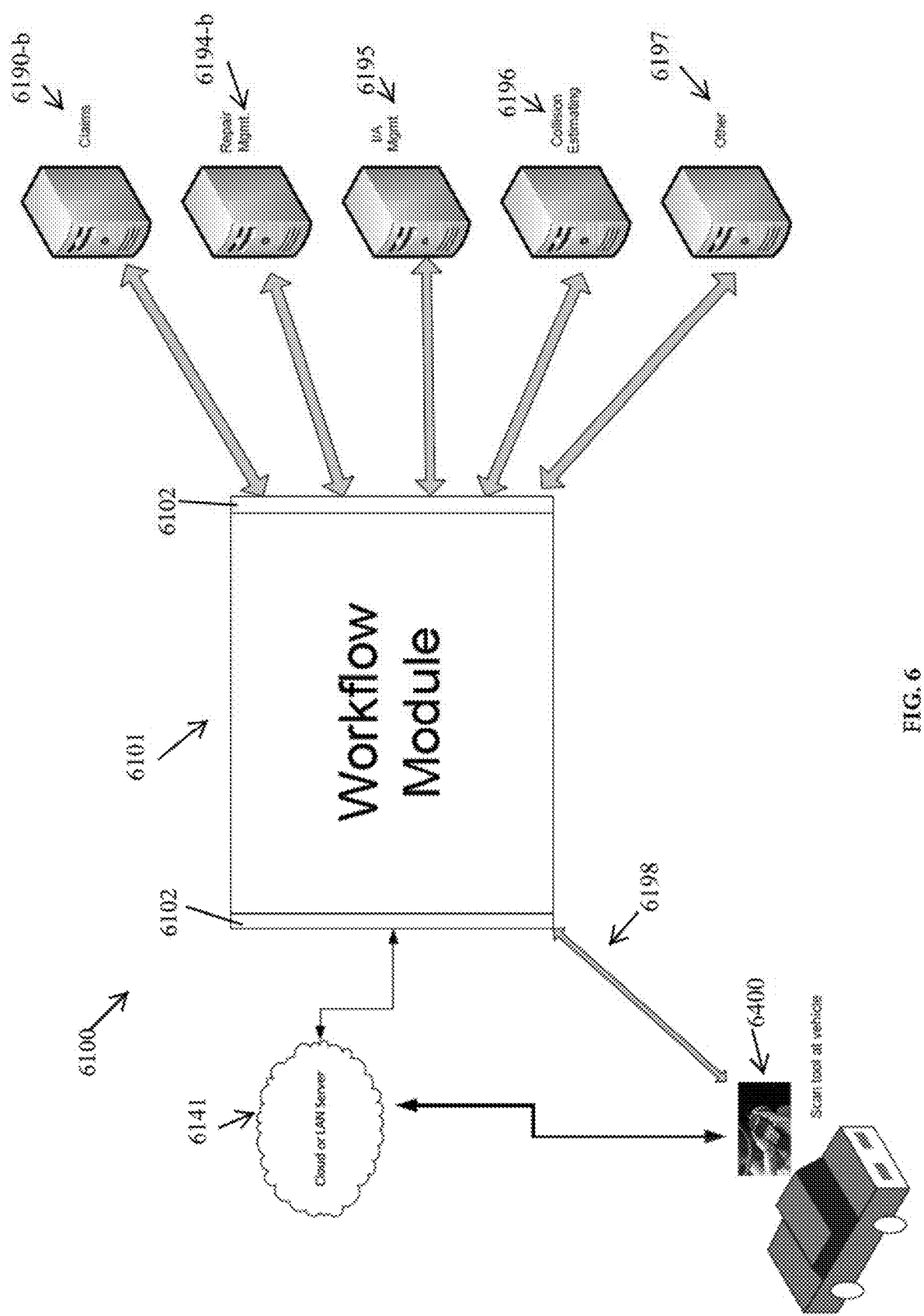

Reference will now be made to FIG. 1 and FIGS. 5-6. Again, FIG. 1 and FIGS. 5-6 illustrate examples of system ("computer system", "computer network") architectures and of diagnostic and repair data flow architectures, according to several aspects. As it will be apparent from the ensuing disclosure, the system and data flow architectures depicted in FIGS. 1 and 5-6 are designed to provide enhanced data and enhanced data flow in the context of vehicle diagnosis and repair, particularly when repairs are necessary due to collisions. As it will be described in more details hereinafter, in one aspect the data flow through the network is streamlined, to avoid network congestion, to use fewer computer and network resources and/or to enable the utilization of smaller databases. In other examples enhanced access to data in real-time and near real-time enabled by the Workflow Module supports more accurate and timely decisions on vehicle repair, billing, and claims processing which enables proper repairs (i.e., for vehicle/people safety); in addition, it enables improved repair facility billing processes, and streamlined claims processing.

In some embodiments, as better seen in FIG. 5, at the core of the disclosed system architecture may be three components: (1) the enhanced diagnostic scan tool(s) 5400 ("New Tool", "scan tool"), (2) a new workflow module 5101 ("Workflow Module"), and (3), application program interface(s) 5102 ("New API") design to facilitate interactions between the Workflow Module 5101 and the rest of the elements of the system 5100.

The New Tool

The term "New Tool" as used herein designates a type of electronic device comprising circuitry and configured to generally perform functions such as recording electronic data; displaying or reproducing electronic data; storing, retrieving, or manipulation of electronic data; providing electrical communications and network connectivity; or any other similar function; and which was enhanced as described herein (e.g., adding workflow applications 4421, repair data module 4417), for the purpose of functioning in the workflow and network described herein. Non-limiting examples of electronic devices include; OEM Scan Tools, A/M Scan Tools, personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device." Some non-limiting examples of portable devices include: cell phones, smart phones, tablet computers, laptop computers, wearable computers such as watches, Google Glasses, etc. and the like.

Figure 4:
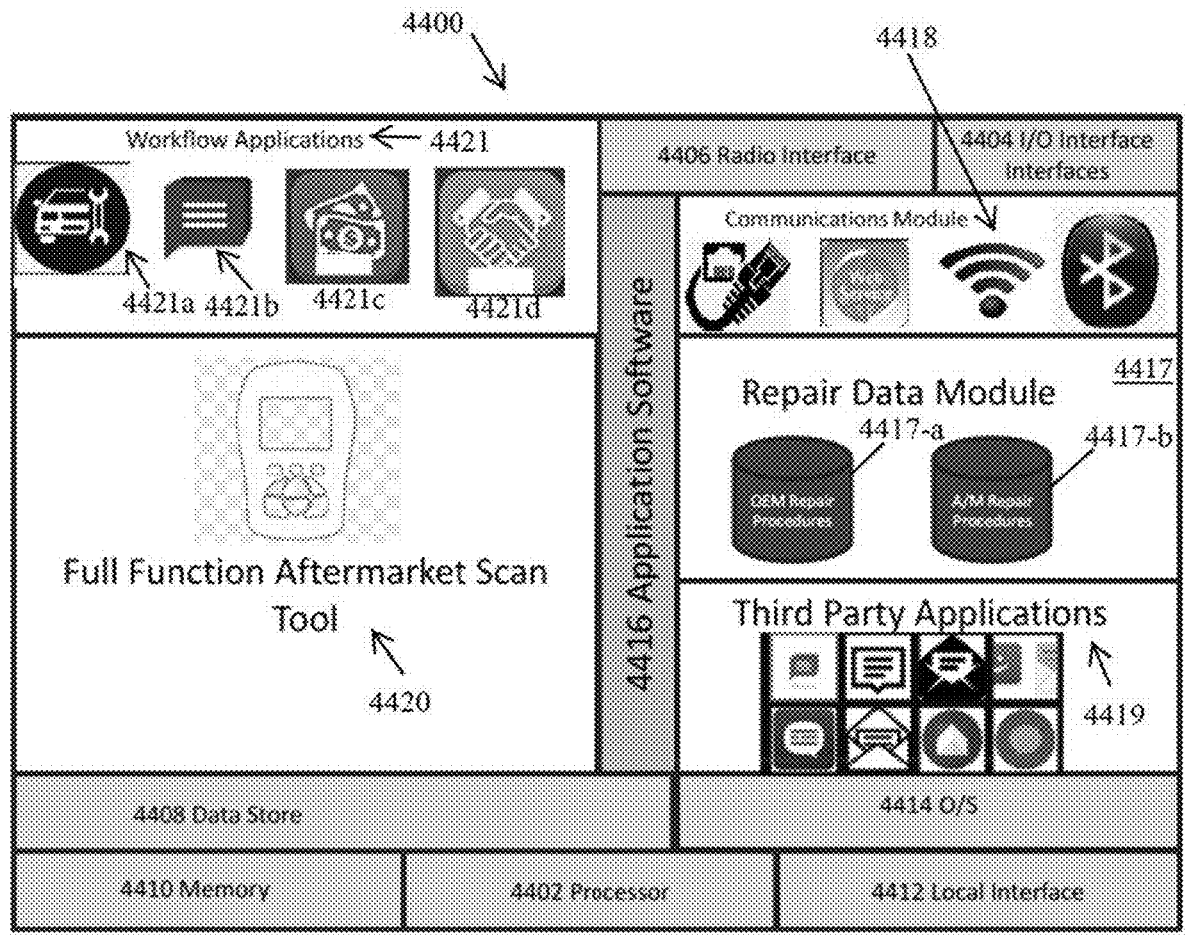
FIG. 4 is a block diagram illustrating an example of structural and functional configuration of an enhanced diagnostic scan tool for use in the systems depicted in FIGS. 1 and 5-6, according to several aspects.

The New Tool 4400 can be a digital device that, in terms of hardware architecture, generally includes a processor 4402, input/output (I/O) Interfaces 4404, a radio interface 4406, a data store 4408, and memory 4410. It should be appreciated by those of ordinary skill in the art that FIG. 4 depicts the New Tool 4400 in an oversimplified manner, and a practical embodiment may include additional components and suitably configured processing logic to support known or conventional operating features that are not described in detail herein. The components (processor 4402, input/output interfaces 4404 ("input/output" or "I/O"), radio interface 4406, data store 4408, and memory 4410) are communicatively coupled via a local interface 4412. The local interface 4412 can be, for example but not limited to, one or more buses or other wired or wireless connections, as is known in the art. The local interface 4412 can have additional elements, which are omitted for simplicity, such as controllers, buffers (caches), drivers, repeaters, and receivers, among many others, to enable communications. Further, the local interface 4412 may include address, control, and/or data connections to enable appropriate communications among the aforementioned components.

The processor 4402 is a hardware device for executing software instructions. The processor 4402 can be any custom made or commercially available processor, a central processing unit (CPU), an auxiliary processor among several processors associated with the New Tool 4400, a semiconductor-based microprocessor (in the form of a microchip or chip set), or generally any device for executing software instructions. When the New Tool 4400 is in operation, the processor 4402 is configured to execute software stored within the memory 4410, to communicate data to and from the memory 4410, and to generally control operations of the New Tool 4400 pursuant to the software instructions. In an exemplary embodiment, the processor 4402 may include a mobile optimized processor such as optimized for power consumption and mobile applications. The I/O Interfaces 4404 can be used to receive user input from and/or for providing system output. User input can be provided via, for example, a keypad (e.g., 2400*b* in FIG. 2*a*), a touch screen, a scroll ball, a scroll bar, buttons, bar code scanner, and the like. The I/O Interfaces 4404 may include an adapter or vehicle interface for connecting to a vehicle computer, for running diagnostics, reprogram or reset modules. System output can be provided via a display device (e.g., 2400*a* in FIG. 2*a*), such as a liquid crystal display (LCD), touch screen, and the like. The I/O Interfaces 4404 can also include, for example, a serial port, a parallel port, a small computer system Interface (SCSI), an infrared (IR) Interface, a radio frequency (RF) Interface, a universal serial bus (USB) Interface, and the like. The I/O Interfaces 4404 can include a graphical user Interface (GUI) that enables a user to interact with the New Tool 4400. Additionally, the I/O Interfaces 4404 may further include an imaging device, i.e. camera, video camera, etc.

The optional radio interface 4406 and the communication module 4418 enable wireless communication to an external access device or network. Any number of suitable wireless data communication protocols, techniques, or methodologies can be supported by the radio 4406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 4408 may be used to store data. The data store 4408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 4408 may incorporate electronic, magnetic, optical, and/or other types of storage media.

The memory 4410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 4410 may incorporate electronic, magnetic, optical, and/or other types of storage media. Note that the memory 4410 may have a distributed architecture, where various components are situated remotely from one another, but can be accessed by the processor 4402. The software in memory 4410 can include one or more software programs, each of which includes an ordered listing of executable instructions for implementing logical functions. In the example of FIG. 4, the software in the memory 4410 includes a suitable operating system (O/S) 4414 and programs 4416. The operating system 4414 essentially controls the execution of other computer programs, and provides scheduling, input-output control, file and data management, memory management, and communication control and related services. The programs 4416 may include various applications, add-ons, etc. configured to provide end user functionality with the New Tool 4400. For example, exemplary programs 4416 may include, but not limited to, a web browser, social networking applications, streaming media applications, games, mapping and location applications, electronic mail applications, financial applications, and the like. In a typical example, the end user typically uses one or more of the programs 4416 along with a network such as the system disclosed herein.

In some embodiments, the New Tool 5400, 4400 may be a new or an enhanced automotive diagnostic scan tool that is designed or adapted to specifically support the collision repair process as described herein. As shown in FIG. 4 as an example, the New Tool 4400 may be an A/M Scan Tool or OEM Scan Tool 4420, which may have or be enhanced to include a data store 4408, a processor 4402, a memory 4410, an operating system 4414, a local interface 4412 a radio interface 4406, input/output (keyboard, display, etc) interfaces 4404 and a communication module 4418. As shown, the communication module 4418 may be configured to enable various communication protocols (e.g., Ethernet, Wi-Fi, Bluetooth, USB, etc.) for connecting the enhanced scan tool 4400 to the Internet or to the workflow module 5101, and thus became an active node in the network 5100.

The New Tool 4400 may be further designed or enhanced to include application software 4416, third-party applications 4419 and, more importantly, workflow applications 4421, specifically configured to enable the New Tool 4400 to interact with the workflow module 5101, as it will be described in more detail hereinafter. The third-party applications 4419 may include applications for claims, production scheduling, car rental, fleet management, third party administration, independent appraiser, and so on.

The New Tool 4400 may be further enhanced to include a Repair Data module 4417, which may include databases 4417*a-b* for storing OEM (Original Equipment Manufacturer) and/or A/M (after market) specific Repair Procedure Data, as well as optional notes from the service writer or production manager for example, received from the workflow module 5101 for the particular vehicle (e.g., make and model associated with the scanned VIN number) and for the necessary repairs and viewable on a display 2400*a* (see FIG. 2*a*) by the repairing technician, using a repair procedure application 4421*a*. The Repair Procedure Data may include audio and/or visual (e.g., images, videos) instructions or guides on how to repair or replace the specific part for the particular vehicle that needs repair.

Again, the New Tool 4400 (i.e., 5400 in FIG. 5) may be enhanced to include one or more workflow applications 4421. The I/O interfaces 4404, may for example allow the technician to receive and send data, including receiving OEM and A/M Repair Procedure Data and/or notes to and from the service writer or production manager for example, through the workflow module 5101, using the workflow application 4421*a*, receiving claim data from the workflow module 5101 using the claim application 4421*d*, receiving or sending repair order data (such as technician assignments, technician Repair Log Data, tech's flat rate hours, repair notes, etc.) using for example the workflow application 4421*a* or a billing application 4421*c*, and other data relevant to the vehicle, the repair order and the insurance claim being processed. As an example, a messaging application 4421*b* (e.g., SMS) may also be provided to enable technician's communication directly from the workflow applications module 4421 with repair facility personnel, insurer adjuster, car owner, car manufacturer, parts providers, and so on.

Again, the New Tool 4400, in addition to the enhancing features described herein (i.e., 4417, 4421, 4418, etc), may contain the features and functions of a standard A/M Scan Tool 4420 or OEM Scan Tool that can run diagnostics, reprogram or reset modules, and other related functions for multiple vehicle manufacturers.

In some embodiments, the New Tool 4400 may capture reports of the vehicle's electronic system status before and after repairs ("Pre-Scan" and "Post-Scan") and communicates those Pre & Post Scan reports to the Workflow Module 5101. The Pre-Scan helps identify the issues that exist with electronic/computerized modules and sensors on the vehicle before the repair begins. Pre-scans will show things like fault codes, communication errors, etc. indicating damaged control modules, sensors, cameras, etc. on the vehicle. This helps to document the pre-repair condition of the vehicle and aids in accurate damage assessment and developing a repair cost estimate. The Post-Scan may be used to document that the vehicle has a clean electronics "report card" showing that all systems are returned to proper function. So, both the Pre-Scan and the Post-Scan, in combination, enable the Workflow Module to document that all necessary repairs were completed and that they were completed properly. It should be noted that an advantage of this process is that it contributes to vehicle safety. Further, the Pre-Scan may also support billing by providing evidence of what repairs were needed.

The New Tool may be connected to the vehicle computer before repairs start to do the Pre-Scan and the New Tool may be configured to push data to the Workflow Module on completion of the scan. Typically, the tool would then be disconnected and repairs begun. During repairs however, the New Tool may be reconnected to perform calibrations, resets, and reprogramming. This would generate Repair Log Data that includes a date and time stamped work/repair log that may also be pushed to the Workflow Module. As an example, once the technician replaces an airbag sensor and puts the bumper back on the vehicle, he would use the New Tool to reset the airbag sensor fault code. As another example, if the technician removed the passenger seat, he would have to recalibrate the seat weight sensor that is used to avoid deploying the airbag if a child is in the seat. The Repair Log Data including the date & time stamped log of these repair operations, captured by the New Tool and pushed to the Workflow Module, can be used for example to support billing the insurer for these repair operations. Today, the repair shop has no way to prove they recalibrated the seat weight sensor if they do the work themselves, so the insurer may not be pay for it. If they take the car to the dealership they receive an invoice showing the work was done, but it greatly disrupts production. Using the system and processes disclosed herein, the repair shop is able to perform the work quickly in-house and have documentation to support billing the insurance company (and to prove the system is now in proper calibration). The tool may then be reconnected after all repairs are completed and the Post-Scan may be run to ensure that all systems are free of fault codes.

Thus, in some embodiments, the New Tool logs, stores, and/or forwards data about each diagnostic and repair operation that the New Tool is used to perform, providing a detailed set of Repair Log Data that includes a date & time stamped log of the actual operations it has performed. In an embodiment, the technician may be prompted to log on the New Tool, and the New Tool may automatically and in real time date/time stamps all of its operations and push them to the Workflow Module. In this way, the Workflow Module has the Repair Log Data needed to produce a detailed work/repair log for diagnostic repairs.

Hence, from the above description it can be derived that some examples of the functions that may be included in the Workflow Module include (a) Recording of the results of a vehicle systems diagnostic scan before and after repairs (Pre-Scan and Post-Scan), or, optionally, even during repairs; (b) recording of repair operations completed by the technician during repairs (Repair Log Data), for example the replacement of a computerized vehicle module or the resetting of a module that has set a Diagnostic Trouble Code; (c) recording of Repair Procedure Data that were referenced during the course of repairs; (d) recording of the time spent by the technician during the repairs (based on the Repair Log Data described hereinbefore).

In some embodiments, the New Tool 4400 (2400 in FIGS. 2a-b) may be a combination of an adaptor device 2104 (FIG. 2b) which supports vehicle connectivity (commonly referred to as a "Dongle") and a computer device 2105 which may be a laptop, tablet or smartphone. If enhanced as described herein, the New Tool 4400, 2400 can work using a variety of computer devices 2105 for the I/O Interface 4404 and can use the industry standard hardware platforms of these devices (e.g., as processor 4402). In other embodiments, the New Tool 4400, 2400 may be a stand-alone tool 2107 (as shown in FIG. 2a) that combines a local interface 4412, a processing module 4402, and I/O Interface 4404 (e.g., a display 2400a and a keyboard 2400b), all in a single device. In further embodiments, the New Tool 4400 may be a proprietary tool that is designed and built specifically for the purpose of functioning in the workflow and network described herein, or it may be an existing tool that is programmed, integrated, or otherwise modified to perform any of the functions described herein.

The Workflow Module

The Workflow Module, 5101, 7101, in some embodiments, may be a workflow solution for streamlining the processing of diagnostic and other data during the collision repair process. The Workflow Module in conjunction with the New Tool streamlines the processing of diagnostic and other data during the collision repair process by for example providing the repair technician with equipment and data to correctly return the vehicle to pre-accident function. The Workflow Module utilizes streamlined electronic data exchange to speed up repairs, ensure correct procedures are utilized, and, in addition, to document the repair operations to support billing and proof of correct repair. In order to achieve these objectives and in the same time avoid network congestion, use fewer computer and network resources and/or enable the utilization of smaller databases, the Workflow Module 5101, 7101 manages data and data flow, retrieves, organizes stores, packages on-demand and sends vehicle and Repair Procedure Data. The enhanced access to data in real-time and near real-time enabled by the Workflow Module supports more accurate and timely decisions on vehicle repair, billing, and claims processing which enables proper repairs, which are critical to vehicle and people safety; in addition, it enables improved repair facility billing processes, and streamlined claims processing. In an example, the Workflow Module 5101, 7101 may include indexes and data access capabilities that allow the data to be queried by a variety of methods. This indexing allows a user to access all data related to for example: (a) a particular insurance claim (those elements indexed to a given claim number); (b) to a particular vehicle (those elements indexed to a particular Vehicle Identification Number ("VIN"); or (c) to a particular vehicle make/model. The new Workflow Module may optionally store data locally on a computer system operated by the repair shop, utilize a model in which data is stored in a cloud computing model on a remote server and accessed via the Internet, utilize a model in which the data is stored on a central server connected via Wide Area Network (WAN), and/or utilize other data storage and access methods or other types of data networks.

Figure 7:
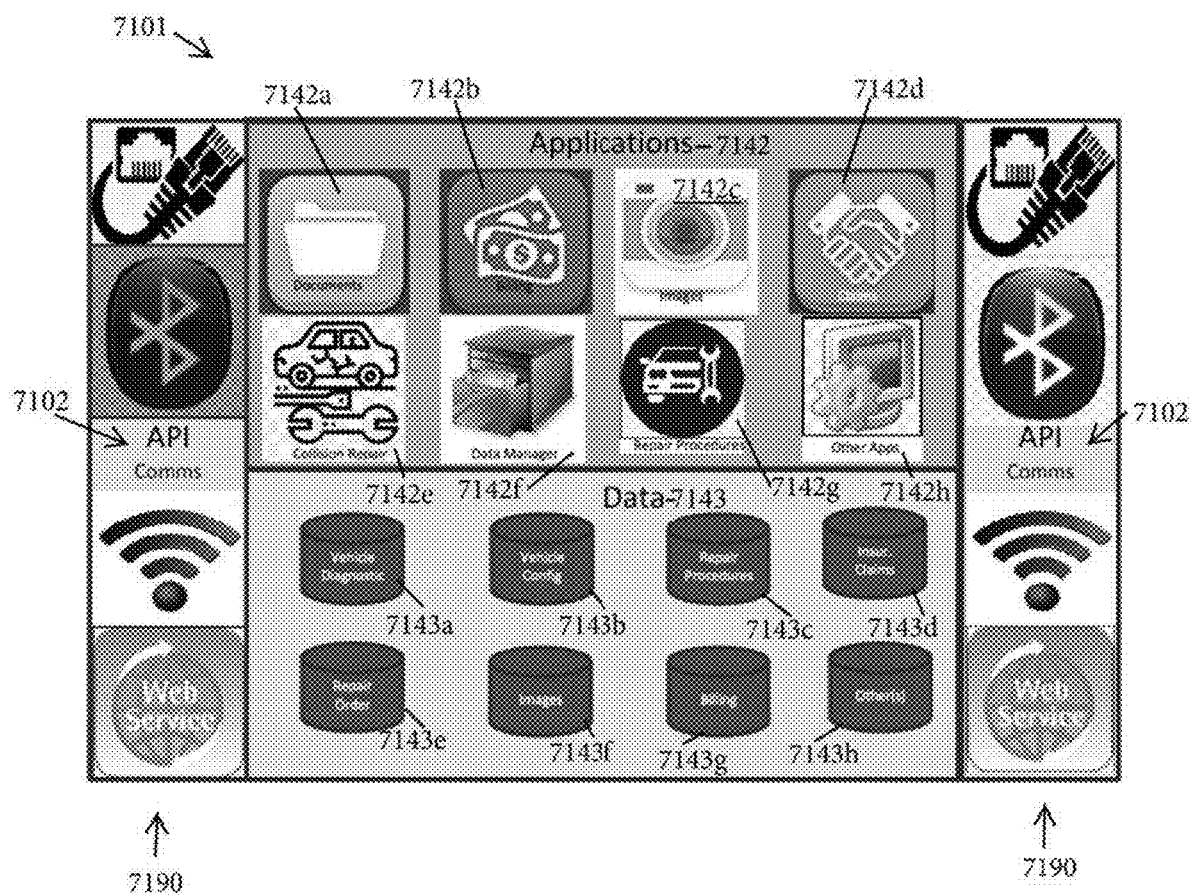
FIG. 7 illustrates an example of architecture of the workflow module from the systems depicted in FIGS. 1 and 5-6, according to several aspects.

FIG. 7 illustrates an example of architecture of the workflow module from the systems depicted in FIGS. 1 and 5-6, according to several aspects. As shown, the workflow module may have a communication module/layer 7190, which, similarly as described earlier when referring to the New Tool and FIG. 4, can use various communication protocols (Ethernet, Wi-Fi, Bluetooth, etc). The communication module 7190 may be used to connect the workflow module 7101 with the New Tool, the repair facility system/network and with third party networks (e.g., insurers' networks, car manufacturers' networks, etc) as exemplary shown in FIGS. 1 and 5-6. Again, APIs 7102 may be provided to facilitate data exchange between the workflow module 7101 and the New Tool 5400, repair facility network 1192, and third party networks (e.g., 1190, 1191, 1193).

The workflow module 7101 may be configured to include and/or employ one or more specialized databases 7143a-h to facilitate the data management as described herein. Again, these specialized databases are relatively small because, in part, as described herein, the workflow module is configured to connect and exchange data with, and thus take advantage of, already existing systems having some of the needed data. Scan tool data received from the New Tool may be stored in a vehicle diagnostic database 7143a. The scan tool data may include pre and post scan reports, code resets, reprogramming and recalibrations, diagnostic repairs and/or other vehicle data. A vehicle configuration database 7143*b* may be provided to store VIN, vehicle year/make/model, and the detailed list of installed vehicle components based on the option and trim packages included on the specific vehicle. A Repair Procedure database 7143*c* may be provided to store Repair Procedure Data received upon specific request for the specific vehicle repair, for example from car manufacturer networks. The Repair Procedure Data may include wiring diagrams, standard repairs times, etc. Again, this arrangement (receiving and storing only specific, on-demand Repair Procedure Data) ensures reduced data flow and usage of a small Repair Procedure database 7143*c* and of fewer network resources. Also, the connectivity between the New Tool and the other claims, estimating and repair management systems in use allows for annotation of Repair Procedure Data to support communication regarding the repair plan amongst the various parties involved in the repair and claims process. Again, this increases the likelihood that proper repair are performed on the vehicle, which in turns increases vehicle and people safety.

An insurance claims database 7143*d* may also be provided to receive and store claim data from insurers' network, for access by for example the repair shop's network. A repair order database 7143*e* may be provided to receive and store repair order data from the repair facility's network for access for example by the repair technician via the New Tool. Image data (e.g., images of collision damage) received for example from an estimator may be stored into an image database 7143*f* for access for example by the repair facility staff. A Technician using a New Tool with an optional camera may also collect and annotate images during the repair process and include them in the image database. A billing database 7143*g* may be provided to store for example billing profile data, final bills issued by repairer for viewing by the insurer. Other databases 7143*h* may be provided to store other data such as communications between technician and repair shop's staff, etc.

As show in FIG. 7, the workflow module 7101 may include several applications 7142 to enable the workflow module to perform the operations and functions described in this disclosure. For example, a document management application 7142*a* may be provided to format reports, index documents, and/or for editing, viewing or printing documents. A billing and payment application 7142*b* may be provided to manage billing profiles, check to ensure that scan operations match with the billing profile and process, etc. An image processing application 7142*c* may be provided to capture, annotate and communicate/transfer images. A claims 7142*d* and a collision repair application 7142*e* may be provided to process insurance claim data, repair planning communications (via, SMS, email, etc.), repair issues, supplemental documentations and requests, process diagnostic data received from the enhanced scan tool, etc. A data manager application 7142*f* may be provided to cross reference scan tool data to existing claims and repairs via VIN match, Year/Make/Model of vehicle, etc., index data by vehicle VIN, repair order number, claim number, technician ID, etc. A repair procedure application 7142*g* may be provided to process Repair Procedure Data received from the car manufacturers, car information systems, etc. Other suitable applications 7142*g*, such as applications supporting communications (SMS, email, etc.) may be provided as well.

Thus, in some embodiments, the system disclosed herein, allows the Workflow module to monitor and record in real time diagnostic scanning activity (e.g., Pre-scan and Post-Scan) and/or diagnostic Repair Log Data performed by the technician with the New Tool. This data is then processed, stored, used as the basis for generating new data and streamlined to various entities involved in the vehicle collision repair process. Again, this data's flow architecture, as described herein, ensures that fewer network resources are used in the collision repair process and associated claim processes, while increasing vehicle safety, by for example documenting that all necessary repairs were done properly, and thus preventing or at least reducing errors and/or fraud. The enhanced access to data in real-time and near real-time enabled by the Workflow Module supports more accurate and timely decisions on vehicle repair, billing, and claims processing which enables proper repairs and also improved repair facility billing processes, and streamlined claims processing.

In an example, an operator could provide the Workflow Module functionality described herein, to repair facilities, as a SaaS (software-as-a-service). For example, a workflow software, programmed according to the Workflow Module's processes and functions described herein, may be installed on operator's server(s) and then allow repair facilities to connect their network to it. So, in this example, the Workflow Module would be in fact the operator's server (or cloud) running the workflow software. The operator may also supply the New Tool to the repair facility, so that The New Tool can then talk to the Workflow Module.

As another example, the workflow software may be licensed to be installed on the repair facilities' server, network or cloud. So, the Workflow Module would be in this example a repair facility's server (or cloud) running the workflow software. The operator may also supply the New Tool to the repair facility, so that The New Tool can then talk to the Workflow Module.

As another example, the operator may provide a New Tool (e.g., a laptop with a dongle), which includes and can run the Workflow software. Since the New Tool is always a node of or part of the new system/network, including repair facility's network and optionally third parties' networks (insurers, vehicle manufacturers, etc), this arrangement may be an option. However, there are some downsides associated with this this approach. One may be that the New Tool may need to be quite a powerful and thus heavy computer, and thus, likely inconvenient to carry around; plus, it could be lost, damaged, etc.

As another example, the New Tool may be an existing scan tool that may already have the capability to send its data to a server, which may be managed by the scan tool manufacturer. In this example, the Workflow Module may be adapted to access the scan tool manufacturer server and pull in data related to the vehicle being repaired and then perform its functions. The New Tool may still need to be enhanced (e.g., with software installations) to have the full functionality described herein, such as for example receiving and displaying to the technician the Repair Procedure Data retrieved by the Workflow Module from the vehicle manufacturer.

The Workflow Module in some embodiments may also utilize tables ("Operations Code Table") which can be maintained for example by the collision repair organization or the automotive insurer. In some embodiments, these Operations Code Tables may be an extension of or addition to a parts/labor code table on the repair shop's management or estimating system, or the Operations Code Table may be a standalone table to support the Workflow Module. The Operations Code Table in some embodiments may store the shops' standard rates for diagnostic repair operations, as well as custom payment profiles for various payers (e.g. Insurance company, insurance claims office, fleet customer, wholesale account, etc.). An example of the use of Operations Code Table would be that for all claims assigned to a repair facility as part of that insurer's Direct Repair Program ("DRP"), in which the rate for a Pre-Scan and Post-Scan is $25 each, and for body module reset is $35 each. These Operations Code Tables may store various categories of specific repair operations, their descriptions, and their associated billing rates which may be expressed as (a) rate by time spent by the technician (e.g. billed at the shops' agreed rate for mechanical labor), (b) rate based on a fixed amount of time (e.g. one hour at the shop's body labor rate), and/or (c) flat rate per operation (e.g. $25 per module reset). This Operations Code Table allows the repair organization to quickly and accurately bill the party paying for repairs and to supply backup documentation to support the billing. In some embodiments, the Workflow Module in conjunction with the Operations Code Table could automatically generate new billing lines for the repair order that included both the description of the operation and the price from the Operations Code Table. In some embodiments, these new billing lines could be passed to the repair shop's systems as a Standardized Transaction (e.g. CIECA BMS, etc.).

The New API

In some embodiments, the New API (e.g., 1102, 5102) may comprise a specification for the method of exchanging data between the Workflow module 1101 and/or various systems utilized in the collision repair, billing, and automotive claims processes described herein. In some embodiments, the implementation of the systems (e.g., 1100, 5100) and methods described herein may include the publication of a Software Developers Kit (SDK) and/or an Application Programming Interface (API) that will allow for application developers and data providers to implement Interfaces among the various components of the systems. The data exchange of the New API may be accomplished with Standardized Transactions (e.g. CIECA BMS transactions, etc.) or may be accomplished by other published or custom data formats.

As an example, optional integration via the New API with OEM and other third party Repair Procedure Data may be provided (see for example 1193 in FIG. 1), to allow technician access to repair procedures via the New Tool (e.g., 2400, 5400) during the course of repairs, as described herein. This could include both Repair Procedure Data from the vehicle manufacturer (for example: Toyota, Honda, Ford, G/M, etc.) and third party sources (for example; I-CAR, ETI, AllData, etc.). This integration with both the Workflow Module and the New Tool allows for multiple parties involved in the repair and claims workflow to view, attach, and annotate Repair Procedure Data specific to the repair event and to interact with one-another, in real-time or nearly in real time, which provides substantial advantages over existing tools (e.g., accuracy of repair for safety purposes).

As another example, optional integration may be provided via the New API 6102 with other collision information systems (1191 in FIG. 1; 6195 in FIG. 6), which may or may not be in use at the collision repair facility, including the repair facility's estimating system 6196/FIG. 6 (for example: CCC ONE, Mitchell Estimating/UltraMate, Solera Audatex, etc.) and other 6197 systems in use by the repair facility for management 5191a, 6195 and billing 6190b (for example: Reynolds & Reynolds, ADP, CCC Repair Workflow, Mitchell Repair Center, Rome Technologies, etc.). The New API could also be utilized for data exchange with vehicle OEMs, insurers claims management systems (1190 in FIG. 1; 6190a in FIG. 6), parts manufacturers and suppliers 5194/FIG. 5, and other entities involved in the automotive collision and claims processes.

Reference will now be made again to FIG. 1 and FIGS. 5-6. Again, FIG. 1 and FIGS. 5-6 illustrate examples of system ("computer system", "computer network") architectures and of diagnostic and repair data flow architectures, according to several aspects. Referring to FIG. 1, it can be seen that in an example, the system 1100 may include the workflow module 1101, which may be connected to the repair facility network ("RFN") 1192, which may include one or more servers (not shown) and one or more client computers used by staff 1211. The RFN 1192 as well as the workflow module may be connected with a cloud computer system 1141. A new Tool 1400 to be used as described herein by a technician when scanning and repairing a vehicle 1180, is also connected to the system 1100, via the RFN 1192 in this exemplary architecture. Further, optionally, the system may include or connect to various third party systems, such as payer systems 1190 (insurers, CMS, Fleet systems, etc.), collision info services systems (e.g., CCC, Mitchell, Rome, etc.) and/or OEM and A/M repair procedure systems 1193 (e.g., Toyota TIS, MOTOR, Alldata, etc.). In this example, the Workflow Module may be a software running on one or more servers (not shown), which are connected to the RFN 1192. The system 1100 may be configured to support the data flow and the processes and functions of the Workflow Module 1101 and of the New Tool 1400 as described in detail in this disclosure. Advantages of this architecture include enhanced decision making during the repair and claims process based on real-time or near real-time access to data which is indexed and cross referenced by the Workflow Module using methods not previously available. An example of this is that a collision facility estimator when developing the repair estimate accessed a Vehicle Repair Procedure that indicated a special battery disconnect procedure was necessary. The estimator would append this Vehicle Repair Procedure to the Workflow Module data record for this vehicle along with an annotation directing the technician to review the battery procedure prior to initiating the repair. The Technician using the New Tool is alerted upon start of repairs of the subject vehicle of the estimator's annotation, can review the Vehicle Repair Procedure on the New Tool and thereby avoid causing additional work necessitated by an incorrect battery disconnection.

Unlike in FIG. 1, in FIG. 5, the New Tool(s) 5400 may be connected directly to the Workflow Module 5101 and indirectly to third parties' systems (5190a, 5193, 5194, 5191a). In this exemplary architecture, the Workflow Module 5101 may be software installed on a server of the repair facility system (1192 in FIG. 1). It should be noted that several New Tools 5400 may be simultaneously connected to the Workflow Module 5101. This may be typical, as each repair technician may carry and use one of the New Tools 5400. This architecture has advantages when for example the repair facility may have poor connections to the Internet and local connectivity provides superior processing.

In FIG. 6, another exemplary system architecture 6100 is depicted. The New Tool 6400 may be connected to a server (e.g., scan tool manufacturer server) 6141 and configured to send data thereto. In this example, the Workflow Module 6101 may be adapted to access server 6141 and pull in data related to the vehicle being repaired and then perform its functions as described in this disclosure. In addition, the New Tool 6400 may be configured to also have a direct connection 6198 with the workflow module 6101. Finally, the Workflow Module 6101, which again, here also may be a software installed on the RFN, may connect optionally to various third party systems (6190b, 6194b, 6195, 6196, 6197).

FIG. 2a illustrates an example of a standalone diagnostic scan tool used as an active node in the computer networks from FIGS. 1 and 5-6, according to an aspect. FIG. 2b illustrates another example of a diagnostic scan tool used as an active node in the computer networks from FIGS. 1 and 5-6, according to an aspect.

Figure 3A:
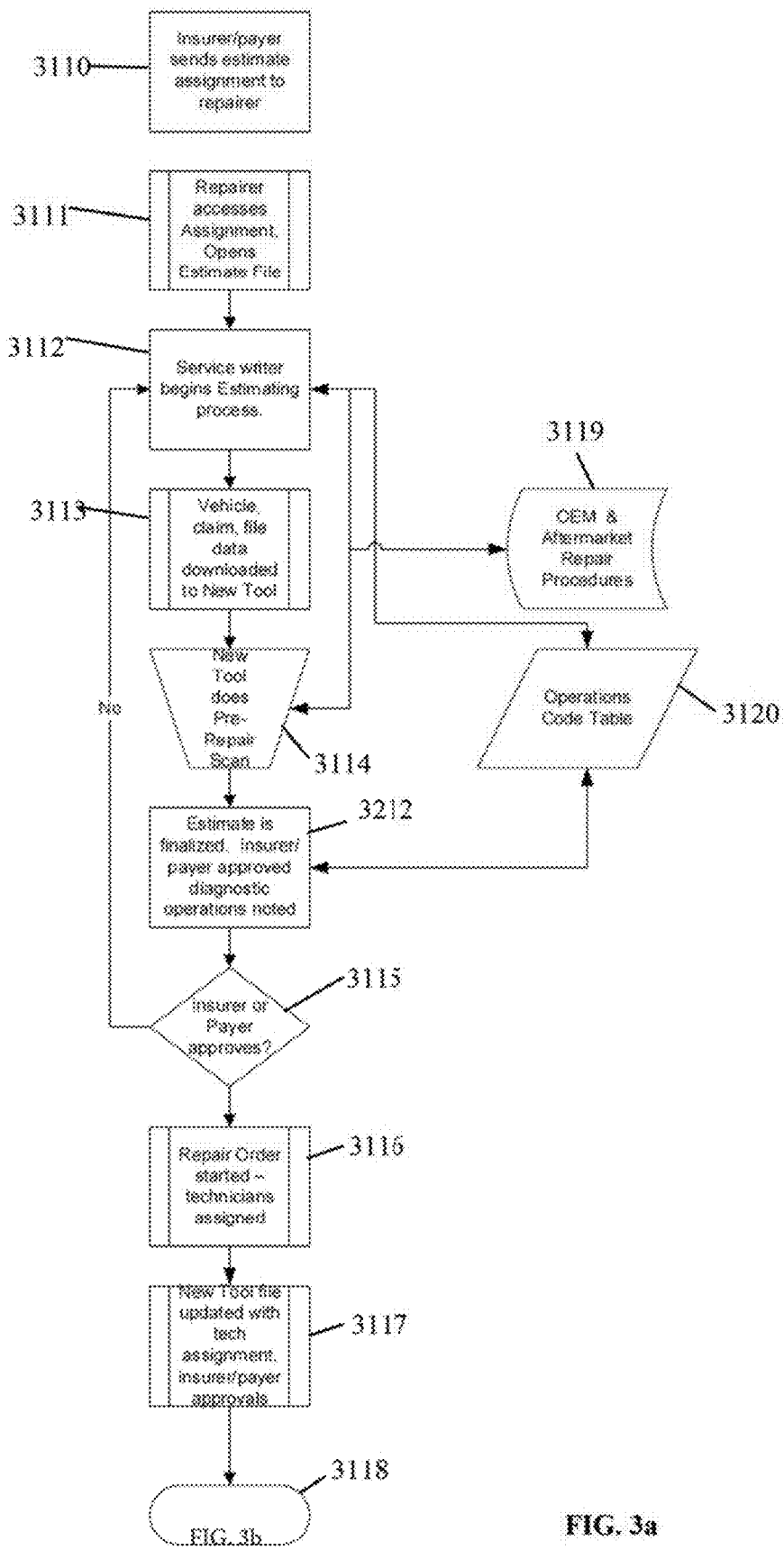
FIGS. 3a-3c are sections of a flow chart illustrating an example of operation of the workflow module from the systems depicted in FIGS. 1 and 5-6, according to an aspect.
Figure 3B:
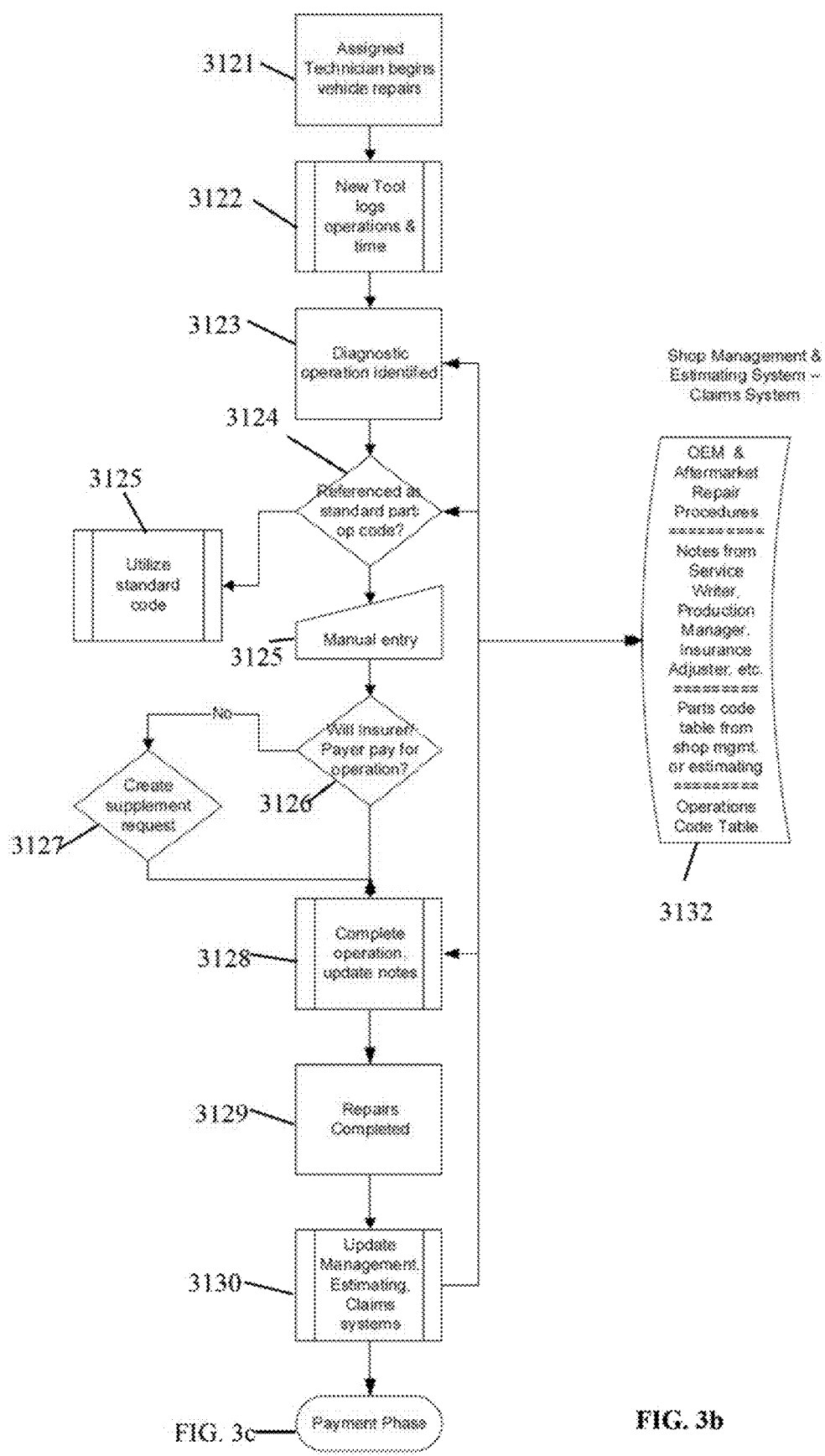
Figure 3C:
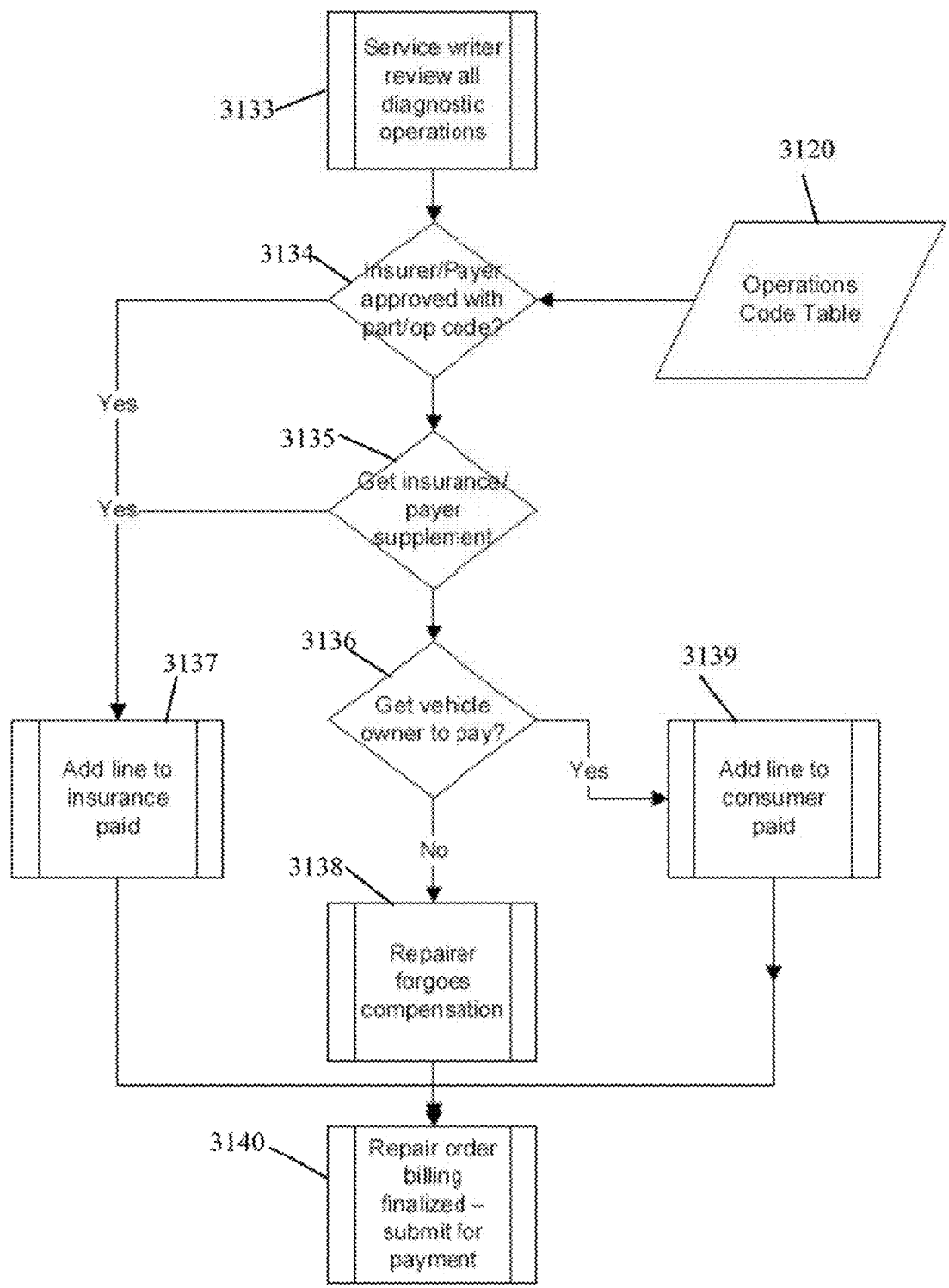

FIGS. 3a-3c are sections of a flow chart illustrating an example of operation of the workflow module from the systems depicted in FIGS. 1 and 5-6, according to an aspect. FIG. 3a shows an example of operation of the workflow module during an estimate and approval phase. FIG. 3b shows an example of operation of the workflow module during a vehicle repair phase. FIG. 3c shows an example of operation of the workflow module during a payment phase. It should be understood that the flowcharts from FIGS. 3a-c and their description, or parts thereof, may be used to construct logic (e.g., write software) for the workflow module to enable it to performs the functions and processes described herein.

As shown in FIG. 3a, in an example, a collision repair process may start (step 3110) with the insurer or payer (e.g., owner of vehicle) sending, via an information provider's network (CCC, Solera, Mitchell for example), an insurance estimate assignment to repairer (e.g., collision repair shop). Next, step 3111, a collision repair shop user would use the workflow module applications 4421 to connect the New Tool 4400 (to the Workflow Module) and download, steps 3112-3113 the insurance assignment for a new repair job. Included in the databases 7143 utilized in the Workflow Module 7101 and downloaded with the insurance assignment could be tables (step 3120) that indicate what the agreed-to pricing for various diagnostic activities and repair operations were for that specific insurer. Other data downloaded could include OEM and Aftermarket Repair Procedure Data (3119) that is specific to the vehicle and repair involved, which may include data either chosen or annotated by the service writer that prepared the repair estimate. Other data included may be the specific technician assigned to this repair, the flat rate hours for the various operations on the repair estimate, and the promised delivery date and other critical production scheduling dates.

The assigned technician would then use the New Tool 5107, 6107 to connect to the vehicle (step 3114), to do a pre-repair scan; the New Tool would verify that the vehicle VIN matched the Repair Order and the insurance claim VIN. If the verification is satisfactory, the repair estimate is finalized (step 3212), sent to insurer/payer for approval (step 3115). If approved, a technician is assigned (step 3116) and the New Tool file is updated (step 3117) with technician assignment, and insurer/payer approval. At the end of the pre-repair scan, a pre-repair diagnostic report would be produced and automatically uploaded to the shop's management system with date/time stamp. This uploading may be for example direct, but still accessible by the Workflow Module, as shown in FIG. 1, or may be via a cloud data storage method in which case the Workflow Module may provide connectivity between the cloud data storage used by New Tool and the shop and insurer systems (see FIGS. 5-6).

The technician would then perform required repairs, resets, reprogramming, etc. using the New Tool (step 3121), with each operation as part of the Repair Log Data being captured by the New Tool for upload (step 3122) using standard code if referenced as such (steps 3123-3125) or as a manual entry (step 3125). The Workflow Module's Operations Code Table (step 3132) can be used to inform the technician whether a certain operation is typically compensated by the insurer, and if so, at what rate (step 3126). This can help the technician to triage potential diagnostic operations into (a) those to be completed immediately and will be compensated by the insurer, (b) those that may be completed even though they are not likely to be compensated, and (c) those that will be noted in the file as a recommended service. The technician may also create supplemental request (step 3127) for repairs not listed as compensable in the Operation Code Table.

Upon completion of the repairs (steps 3128-3129) an after-repair scan may be performed and all of the relevant data for the repair would be available for upload to for example the shops management system and through the New API to other systems including selected data being transferred to the insurer's claim system (step 3130). The Workflow Module may capture all of the repair and diagnostic operations completed, to be stored in a data warehouse. This data warehouse may contain data valuable to vehicle manufacturers, repair data providers, parts manufacturers, and others in the automotive aftermarket seeking to improve vehicle function and repair processes.

In the payment phase shown in FIG. 3c, the service writer may first review all diagnostic operations (step 3133), consult the Operation Code Table (step 3120) and determine if the insurer/payer approved a particular part or operation code (step 3134). If the answer is yes, the item is added to the insurance paid section of the repair order bill (steps 3137, 3140). If the answer is no, the item can be billed to owner (steps 3136, 3139, 3140) or the repairer may forgo compensation (step 3138). The Workflow Module provides enhanced billing over existing process through its ability to in real-time or near real-time combine and process vehicle diagnostic data from the New Tool, Operation Code data, and data from other repair and claims systems to produce automated billing entries, or to inform repair facility staff of recommended billing.

Figure 8A:
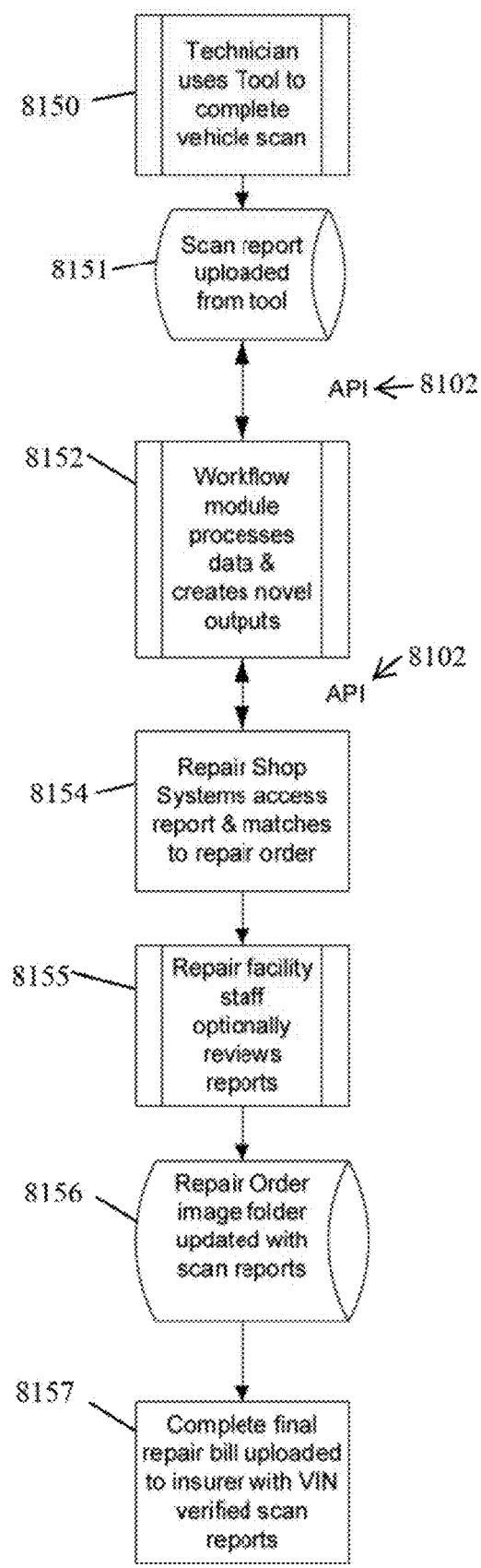
FIG. 8a shows an example of a basic embodiment of the disclosed system as used by a collision repair facility.

FIG. 8a is a flow chart depicting an example of a basic process of use of the disclosed system by a collision repair facility, according to an aspect. As shown, at the completion of the repairs, the repair technician may use the New Tool 5400 to complete a vehicle diagnostic scan (step 8150). This is the Post-Scan. As described hereinbefore, the technician may also perform a Pre-Scan before the repairs begin and also connect the New Tool to capture diagnostic repairs. The Post-Scan report (as well as the Pre-Scan report and work reports captured during diagnostic repairs) may then be uploaded (step 8151) to the Workflow Module. As described hereinbefore, API 8102 may be provided to enable data communication among the Workflow Module, New Tool, repair facility network and third parties' networks (e.g., insurers, vehicle manufacturers, claim management services, etc).

Next, (step 8152), the Workflow Module may process the data received from the New Tool, and may create novel data outputs and reports. An example of a new output is a Post-Scan report that breaks out mechanical repair Diagnostic Trouble Codes (DTC's) that are unrelated to the collision event and/or pre-date the collision event. This report informs the customer of issues that are unrelated to the collision claim but still need attention and gives the auto insurer assurance that only items related to the collision were repaired as part of the claim payment. The Workflow Module at this time may also process data received from the New Tool to create repair or work logs of diagnostic repair operations completed during the repair process (Repair Log Data) using the New Tool. Examples of data that may be included on the work log would be date/time stamped entries for start and stop times for performing an ADAS (Advanced Driver Assistance Systems) system recalibration, or for resetting the seat weight sensor in the passenger seat. This work log, together with the other reports (Pre-scan, Post-scan) may be used to evaluate whether the vehicle was properly repaired and is thus safe to drive. These reports may also be used to support billing the insurance carrier for these operations.

Next, for example after being notified by the Workflow Module, the repair facility's system may access the new reports and match them with the repair order (step 8154). The repair facility staff may optionally review (step 8155) the scan reports and/or the new reports provided by the Workflow Module. The repair order file may next be updated with the scan reports and/or the new reports generated by the Workflow Module (step 8156). In an example, the repair order file may be stored in the repair facility's network and the update would occur after an instruction was received from the Workflow Module. Finally, in step 8157, a complete final repair bill may be generated based on the scan reports and or new reports generated by the Workflow Module and the final bill may then be uploaded to insurer's system with VIN verified scan reports.

Referring to the example as shown in FIG. 8*a*, it should be noted that the disclosed system offers unique advantages over existing systems, processes and methods. As an example, the system provides a method to document the diagnostic condition of the vehicle before (Pre-Scan), during and after (Post Scan) repairs and to capture and document scan tool repair procedures executed on the vehicle in a manner that does not require manual intervention. The process moves data seamlessly through IP connectivity, so that the repairer's estimating and/or management system and by extension the insurer's claims management systems are updated with scan tool documentation. An additional benefit of the disclosed system is that the method of documentation in a closed-loop IP system provides assurance to the repairer and the insurer that the documented operations are proven to have been conducted on the vehicle with the VIN #shown on the documents. Thus, some of the benefits of the systems and associated processes disclosed herein are safe repairs, enhanced billing process, and the prevention or reduction of errors and/or fraud.

Figure 8B:
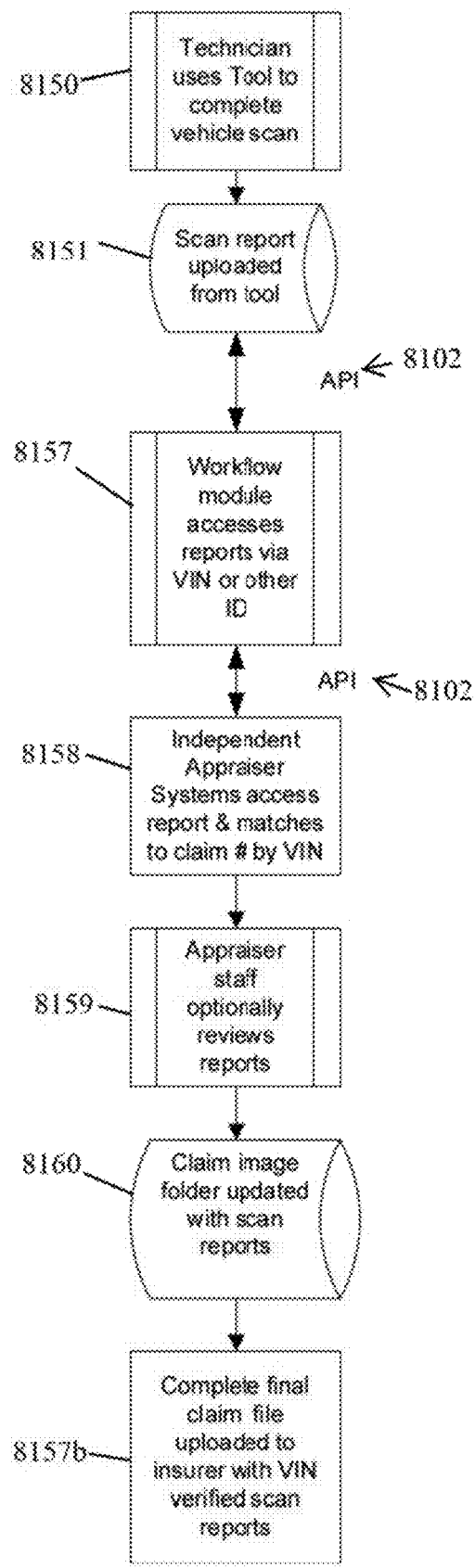
FIG. 8b shows an example of a basic embodiment of the disclosed system as used by an independent appraiser.

FIG. 8*b* shows an example of a basic embodiment of the disclosed system as used by an independent appraiser, according to an aspect. As shown, the repair technician may use the New Tool 5400 to complete a vehicle scan (step 8150). This may be the Pre-Scan, Post-Scan or scans during repair while for example performing diagnostic repairs as described hereinbefore (work logs). The scan report(s) and/or the work logs may then be uploaded (step 8151) to the Workflow Module. Again, API 8102 may be provided to enable data communication among the Workflow Module, New Tool, repair facility network and/or third parties' networks (e.g., insurers, vehicle manufacturers, claim management services, etc).

Next, (step 8157), the Workflow Module may process the data (scan reports and/or work logs) received from the New Tool, and may index the data or the newly generated report(s) (e.g., DTC's that predate the collision event, unrelated mechanical repairs) using the VIN, or other ID. Next (step 8158), an independent appraiser network/system may be permitted to connect to the Workflow Module and access the report(s). The independent appraiser system may then match the report(s) to claim number by using the VIN. The appraiser staff may optionally review (step 8159) the scan reports and/or the new reports provided by the Workflow Module. The claim file may next be updated with the scan reports and/or the new reports generated by the Workflow Module (step 8160). Finally, in step 8157*b*, a complete final claim file may be generated based on the scan reports and/or the new reports generated by the Workflow Module and the final claim file may then be uploaded to insurer's system with VIN verified scan reports.

Referring to the example as shown in FIG. 8*b*, the system offers unique advantages over existing processes and methods. The system provides a method to document the diagnostic condition of the vehicle before, during and after repairs and to capture and document scan tool procedures executed on the vehicle in a manner that does not require manual intervention. The process moves data seamlessly through IP connectivity so that the independent appraisers' estimating and/or management system and by extension the insurer's claims management systems are updated with scan tool documentation. An additional benefit of the disclosed system is that the method of documentation in a closed-loop IP system provides assurance to the independent appraiser and the insurer that the documented operations are proven to have been conducted on the vehicle with the VIN #shown on the documents.

Figure 8C:
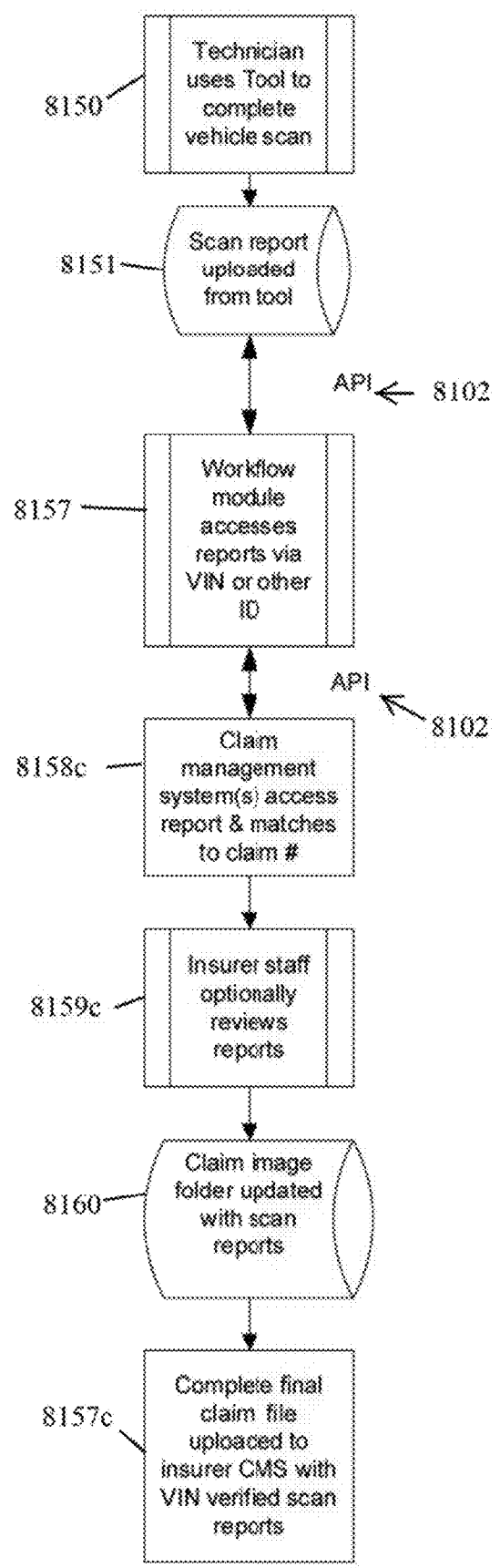
FIG. 8c shows an example of a basic embodiment of the disclosed system as used by an insurer.

FIG. 8*c* shows an example of a basic embodiment of the disclosed system as used by an insurer, according to an aspect. As shown, the repair technician may use the New Tool 5400 to complete a vehicle scan (step 8150). This may be the Pre-Scan, Post-Scan or scans during repair while for example performing diagnostic repairs as described hereinbefore (work logs). The scan report(s) and/or the work logs may then be uploaded from the New Tool (step 8151) to the Workflow Module. Again, API 8102 may be provided to enable data communication among the Workflow Module, New Tool, repair facility network and/or third parties' networks (e.g., insurers, vehicle manufacturers, claim management services, etc).

Next, (step 8157), the Workflow Module may process the data (scan reports and/or work logs) received from the New Tool, and may index the data or the newly generated report(s) (e.g., DTC's that predate the collision event) using the VIN, or other ID. Next (step 8158*c*), a claim management network/system may be permitted to connect to the Workflow Module and access the report(s). The claim management system (CMS) may then match the report(s) to claim number by using the VIN. The insurer staff may optionally review (step 8159*c*) the scan reports and/or the new reports provided by the Workflow Module. The claim file may next be updated with the scan reports and/or the new reports generated by the Workflow Module (step 8160). Finally, in step 8157*c*, a complete final claim file may be generated based on the scan reports and/or the new reports generated by the Workflow Module and the final claim file may then be uploaded to insurer's CMS system with VIN verified scan reports.

Referring to the example as shown in FIG. 8*c*, the system offers unique advantages over existing processes and methods. The system provides a method to document the diagnostic condition of the vehicle before, during and after repairs and to capture and document scan tool procedures executed on the vehicle in a manner that does not require manual intervention. The process moves data seamlessly through IP connectivity so that the insurer's claims management systems are updated with scan tool documentation. Again, an additional benefit of the disclosed system is that the method of documentation in a closed-loop IP system provides assurance to the insurer's field and claim office staff & management that the documented operations are proven to have been conducted on the vehicle with the VIN #shown on the documents.

Figure 8D:
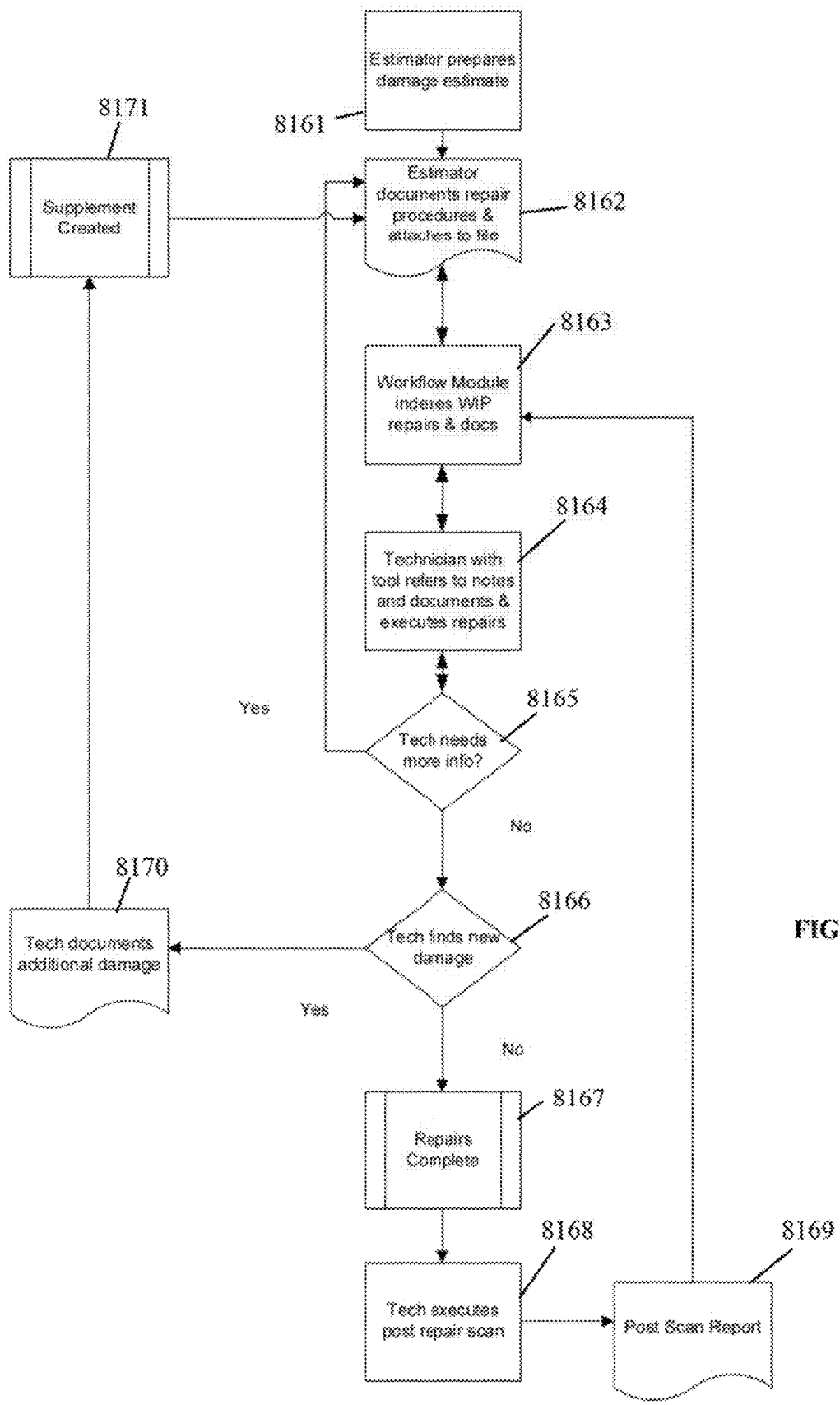
FIG. 8d shows an example of the disclosed system's capabilities related to communications in the repair facility.

FIG. 8*d* shows an exemplary embodiment of the disclosed system's capabilities related to communications in the repair facility, according to an aspect. As shown, the system disclosed herein provides a method by which the front office staff of a repair facility (e.g., estimators, repair planners, and production managers) can document a repair order file with repair procedures, diagrams, images, and notes relevant to the needed repairs on the vehicle. In an example, an estimator may login the Workflow Module application and start preparing a damage estimate (step 8161), which may include the vehicle's VIN, repairs needed (e.g., front bumper, bumper sensors etc.). Next, the Workflow Module may be configured to connect to an OEM or AM repair database (see 5194 in FIG. 5) and, using the VIN, locate and download only the specific Repair Procedure Data (e.g., repair guide) needed for that vehicle and only for the identified repairs. This, again, ensures that the data flow and the database size of the Workflow Module (see 7143*c* in FIG. 7) and of the New Tool (see 4417 in FIG. 4) is minimized, saving system resources.

Next, the Workflow Module may automatically attach the repair procedures to the vehicle file, having for example the VIN as the file number. Alternatively, the estimator may prepare the estimate on the repair facility's system, attach the repair procedures to the file and optionally annotate the repair procedures with notes (step 8162) and upload to the Workflow Module. Next, the Workflow Module indexes the repair procedure documents and the estimate using for example the VIN number.

Through connectivity (e.g., IP connection) between the repair facility systems, the Workflow Module, and the New Tool, the information (estimate, repair procedures, etc.) may be passed to the technician executing the repairs and can be accessed on the New Tool (step 8164). The technician via a two-way electronic messaging (such as SMS or email as two non-limiting examples; see for example workflow application 4421*b* in FIG. 4) can interact with front office staff to request additional information (step 8165), inquire about a proposed modification to the repair plan (step 8166), or document additional damage (step 8170) not shown on the existing damage appraisal estimate. Such additional damage may be identified for example from a Pre-Scan report. Front office staff can message the technician and optionally attach new repair procedure documents, and modify or approve a proposed repair plan (step 8171).

Next, the technician may perform the repairs, including diagnostic repairs if needed using the New Tool that will generate the work logs (Repair Log Data). When the repairs are complete (step 8167), the technician may execute (step 8168) a post repair scan that will generate a Post-scan report (step 8169). All reports, as described hereinbefore, may be uploaded automatically by the New Tool to the Workflow Module, which may store and index them in vehicle diagnostic database 7143*a* (FIG. 7) and/or process them, including by generating new reports as described hereinbefore.

Thus, in an aspect, the communications capabilities described herein improve over existing systems and methods in that the New Tool is connected (via IP for example) through the Workflow Module to support communications with the front office specific to a given vehicle repair.

Figure 8E:
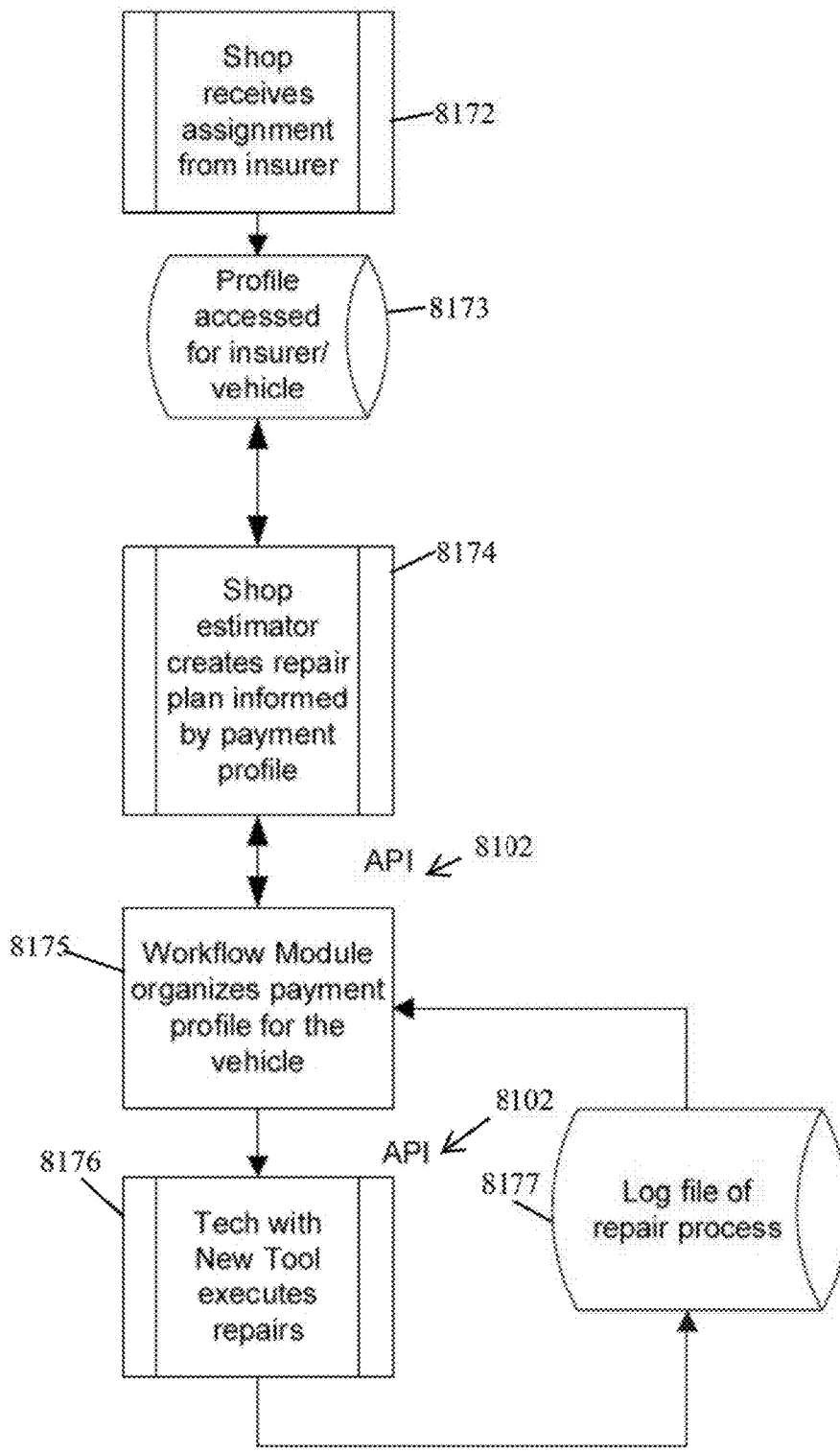
FIG. 8e shows an example of embodiment of the disclosed system's capabilities related to repair payment profiles.

FIG. 8*e* shows an exemplary embodiment of the disclosed system's capabilities related to repair payment profiles, according to an aspect. As shown, the Workflow Module of the system serves to electronically link payment profile information to support repair decisions and accurate billing to the party paying for repairs. These payment profiles may be stored optionally in the repair facility estimating system, the repair facility management system or in the Workflow Module. After receiving the assignment from the insurer (step 8172), the payment profile of that insurer for the particular vehicle that needs repairs may be accessed (step 8173). An example of a payment profile entry is as follows: Allstar Insurance pays for pre-repair scans on all vehicles model year 2012 and newer, at a rate of $25 plus one hour at the body labor rate.

The payment profiles inform both the shop estimator/repair planner and the technician about how to plan for and execute repairs (step 8174). For example, if a certain insurer does not pay for pre-repair scans on the subject vehicle, and damage is light, the estimator/repair planner may decide to forgo a pre-repair scan. The repair plan may then be sent via API 8102 to the Workflow Module, which may store it, include it in the vehicle file (step 8175) and make it available to the technician on the New Tool. The technician may also modify his/her decisions based on payment profile data which is now viewable and available on the New Tool. For example, seeing that the insurer pays for steering angle reset on this vehicle, the technician may perform that operation. The technician uses the New Tool to perform repairs (step 8176) and the New Tool's data logging capabilities record (step 8177) the technician time spent performing the procedure (Repair Log Data) and can be used to support and document repair billing.

The advantage of the disclosed system over prior methods is that the Workflow Module links existing and new payment profile data with the scan tool performing the repairs (New Tool) through IP connectivity. This improves communication of payment profile information over other methods. The disclosed process also allows for the system to log time spent performing the repair operations with the New Tool and systematically process the time logs to support and document the repair billing.

Figure 8F:
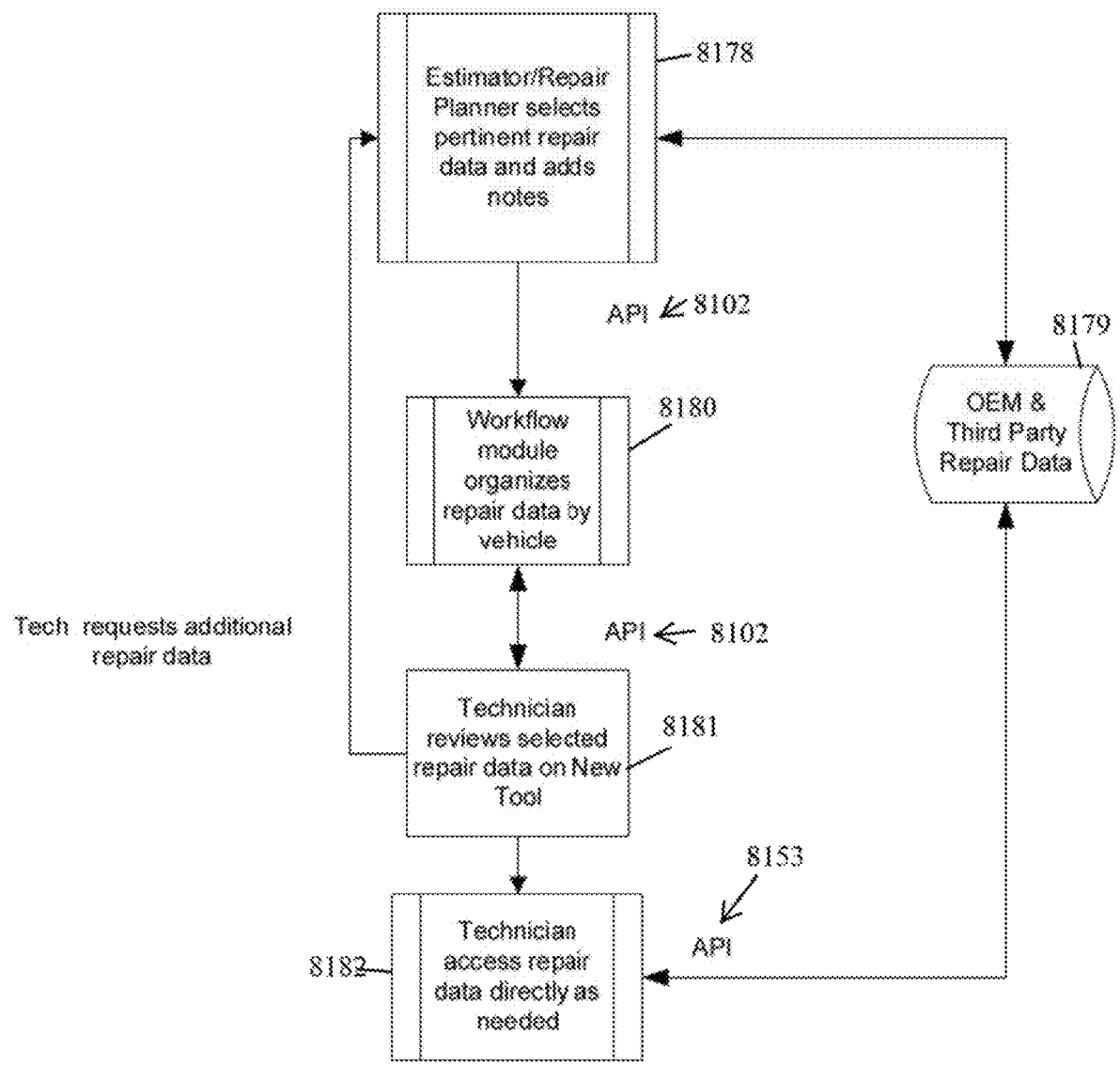
FIG. 8f is a flow chart depicting exemplary steps of an exemplary embodiment of the disclosed system capabilities related to repair procedure data.

FIG. 8*f* is a flow chart depicting exemplary steps of an exemplary embodiment of the disclosed system capabilities related to Repair Procedure Data, according to an aspect.

Non-limiting examples of Repair Procedure Data include databases supplied by vehicle manufacturers such as Toyota's Technical Information System (TIS), Alldata, Mitchell's TechAdvisor, and Motor Information Systems. The Workflow Module is able to store and forward (step 8180) Repair Procedure Data noted by and optionally annotated by the estimator (step 8178) and makes it available to the technician on the New Tool, so that he can consult them while working on the vehicle (step 8181). The technician can add notes based on the Repair Procedure Data accessed, and may also request additional Repair Procedure Data through the system either by accessing Repair Procedure Databases using the New Tool, via the Workflow module (see for example FIG. 5) or directly (steps 8153-8179), or by messaging through the Workflow Module so that the estimator/repair planner can access and send addition Repair Procedure Data documents. Thus, in an aspect, the disclosed system improves over existing systems and methods in that the New Tool combines the functions of a scan tool and the ability to receive repair plans and Repair Procedure Data on a single device.

It should be understood that the flowcharts from FIGS. 8*a-f* and their description, or parts thereof, may be used to construct logic (e.g., write a software) for the Workflow Module and/or the New Tool to enable them to perform the functions and processes described herein.

In some embodiments, the disclosed system may include a machine (the New Tool) and method of processing Diagnostic Data during the collision repair and automotive claims processes that allows for both diagnostic based repairs and the documentation of repair operations to support file documentation for proving that reliable repairs were performed and also for billing using a single system (the Workflow Module).

In some embodiments, the disclosed system and methods may allow a technician to access data from the repair shop's management and/or estimating systems via the same device (the New Tool) used to perform diagnostic data based repairs.

In some embodiments, the disclosed system and methods may include a method of electronically verifying the vehicle VIN match from the New Tool to confirm an exact match with the VIN on the insurer's assignment thereby preventing the insurer (or fleet operator or TPA) from paying for repairs on a non-insured vehicle.

In some embodiments, the disclosed system and methods may include a method of storing and organizing all data input into and processed by the New Tool that organizes, indexes, and stores all relevant data by the collision repair organization in either local area storage or in a cloud based (Internet accessible) storage.

In some embodiments, the disclosed system and methods may include an Operations Code Table of diagnostic repair billing profiles that produces automated billing based on the operations performed, customized by any combination of the skill level of the technician, the make of vehicle, the insurance company/claims office paying the claim, the amount of time spent on the repair operation, and other criteria.

In further embodiments, the resulting billing data is transferred to other systems in use by the collision repair organization through the use of the Workflow Module and the New API. The result is that line item billing specific to the operations performed by the Technician may be automatically transferred to the repair facilities' management or estimating system such as CCC, Mitchell, Solera, or others.

In some embodiments, the disclosed system and methods may provide a platform which allows automated messaging on the New Tool used to do diagnostic operations between the repair Technician and others involved in the process including repair shop personnel, insurance claims adjusters, TPA staff, the vehicle owner, etc. This automated messaging may include email type messaging, text messaging type messaging, short message service type messaging, multimedia type messaging, voice mail type messaging, or any other suitable type of messaging which may be used to communicate data and information between the repair Technician and others involved in the process.

In some embodiments, the disclosed system and methods may provide a New Tool designed specifically for collision repair Technicians with functionality targeting those vehicle systems most likely to be involved in collision repairs. By focusing on those systems and functions most likely to be involved in a collision repair, the tool is easier to use for a collision technician than a general purpose A/M or OEM Scan Tool designed for mechanical repairs; in addition, for the same reason, it may be a slimmer tool, requiring less computer resources, which in turn may make it less expensive.

In some embodiments, the disclosed system and methods may provide pre-population of the vehicle VIN, year/make/model, trim package, and options in the New Tool via electronic Interface from the Workflow Module to ensure proper procedures are followed in the repair.

In some embodiments, the disclosed system and methods may provide end-to-end documentation of all work done with the New Tool during the repair process including: Complete Pre-Scan results of vehicle electronic systems; all repair operations (Repair Log Data) completed by the technician that were supported by the New Tool (for example; code resets, system calibrations, module initializations, module reprogramming, etc.); indexing and documenting of the repair operations by Technician skill set, time spent, insurance company/claim office associated with the claim, vehicle make/model/options, and other factors that can impact billing and collections; a Post-Scan showing status of vehicle electronic systems after repairs; Technician time logs that can support internal payroll processing, and insurer billing for repair time on diagnostic related repairs.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A system comprising:
a diagnostic scan tool comprising an adapter configured to couple the diagnostic scan tool to a vehicle computing network in a vehicle damaged in a collision event; and
a workflow computing device comprising:
at least one processor;
a first application programming interface (API) configured to enable data communication between the workflow computing device and the diagnostic scan tool;
a second API configured to enable data communication between the workflow computing device and with a third-party network device; and
a memory comprising programmed instructions stored thereon coupled to the at least one processor, wherein, the at least one processor is programmed to execute the stored programmed instructions to:
obtain from the diagnostic scan tool when coupled to the vehicle computing network in the vehicle, via the first API, an identification of the vehicle and diagnostic data for the vehicle that requires one or more collision repair operations including replacement, reprogramming, recalibration, or repair of one or more systems or components of the vehicle that were damaged during the collision event;
retrieve from the third-party network device, via the second API, specific repair procedure data for the vehicle based on the identification of the vehicle and the diagnostic data;
send the specific repair procedure data to the diagnostic scan tool for viewing on a display of the diagnostic scan tool, via the second API; monitor and record in real time, via the first API, repair operations data received for the one or more collision repair operations on the one or more systems or components of the vehicle with the diagnostic scan tool when coupled to the vehicle computing network in the vehicle;
process the repair operations data received from the diagnostic scan tool prior to and after the one or more collision repair operations to determine proof data proving that the one or more collision repair operations were completed on the vehicle; and
transmit the proof data to the third-party network device, via the second API.

2. The system as set forth in claim 1, wherein for the retrieve from the third-party network device the specific repair procedure data for the vehicle, the at least one processor is further configured to be capable of executing the stored programmed instructions to:
retrieve other repair procedure data for the one or more collision repair operations that includes prior annotated data, via at least one of the first API and/or the second API; and
send the other repair procedure data to the diagnostic scan tool for viewing on the display of the diagnostic scan tool, via the first API.

3. The system as set forth in claim 1, wherein to monitor and record in real time, via the first API, repair operations data received for the one or more collision repair operations, the at least one processor is further configured to be capable of executing the stored programmed instructions to:
monitor and record in real time, via the first API, repair recalibration data from one or more recalibrations performed on one or more electronic modules or one or more sensors of the vehicle related to the one or more collision repair operations on the one or more systems or components of the vehicle with the diagnostic scan tool when coupled to the vehicle computing network in the vehicle.

4. The system as set forth in claim 1, wherein to monitor and record in real time, via the first API, repair operations data received for the one or more collision repair operations, the at least one processor is further configured to be capable of executing the stored programmed instructions to:
monitor and record in real time, via the first API, reprograming data from reprogramming of one or more electronic modules or one or more sensors of the vehicle related to the one or more collision repair operations on the one or more systems or components of the vehicle with the diagnostic scan tool when coupled to the vehicle computing network in the vehicle.

5. The system as set forth in claim 1, wherein the at least one processor is further configured to be capable of executing the stored programmed instructions to:
reset, via the first API, one or more codes on one or more electronic modules or one or more sensors of the vehicle related to the one or more collision repair operations on the one or more systems or components of the vehicle with the diagnostic scan tool when coupled to the vehicle computing network in the vehicle.

6. The system as set forth in claim 1, wherein the identification of the vehicle further comprises at least vehicle identification number (VIN) data obtained by the diagnostic scan tool.

7. A non-transitory computer readable medium having stored thereon instructions comprising executable code which when executed by one or more processors, causes the one or more processors to:
obtain from a diagnostic scan tool comprising an adapter configured to couple the diagnostic scan tool to a vehicle computing network in a vehicle damaged in a collision event, when the diagnostic scan tool is coupled to the vehicle computing network in the vehicle, via a first application programming interface (API) that enables data communication between the one or more processors and the diagnostic scan tool, an identification of the vehicle and diagnostic data for the vehicle that requires one or more collision repair operations including replacement, reprogramming, recalibration, or repair of one or more systems or components of the vehicle that were damaged during the collision event;
retrieve from a third-party network device, via a second API that enables data communication between the one or more processors and the third-party network device, specific repair procedure data for the vehicle based on the identification of the vehicle and the diagnostic data;
send the specific repair procedure data to the diagnostic scan tool for viewing on a display of the diagnostic scan tool, via the second API;
monitor and record in real time, via the first API, repair operations data received for the one or more collision repair operations on the one or more systems or components of the vehicle with the diagnostic scan tool when coupled to the vehicle computing network in the vehicle, wherein the repair operations data includes recalibration data from one or more recalibrations performed on one or more electronic modules or one or more sensors of the vehicle and reprograming data from reprogramming of the one or more electronic modules or the one or more sensors of the vehicle associated with the one or more systems or components of the vehicle; and process the repair operations data received from the diagnostic scan tool prior to and after the one or more collision repair operations to determine proof data proving that the one or more collision repair operations were completed on the vehicle; and transmit the proof data to the third-party network device, via the second API.

8. The non-transitory computer readable medium as set forth in claim 7, wherein for the retrieve from the third-party network device the specific repair procedure data for the vehicle, the instructions further comprise executable code which when executed by the one or more processors, causes the one or more processors to:

retrieve other repair procedure data for the one or more collision repair operations that includes prior annotated data, via at least one of the first API and/or the second API; and send the other repair procedure data to the diagnostic scan tool for viewing on the display of the diagnostic scan tool, via the first API.

9. The non-transitory computer readable medium as set forth in claim 7, the instructions further comprise executable code which when executed by the one or more processors, causes the one or more processors to:

reset, via the first API, one or more codes on the one or more electronic modules or the one or more sensors of the vehicle related to the one or more collision repair operations on the one or more systems or components of the vehicle with the diagnostic scan tool when coupled to the vehicle computing network in the vehicle.

10. The non-transitory computer readable medium as set forth in claim 7, wherein the identification of the vehicle further comprises at least vehicle identification number (VIN) data obtained by the diagnostic scan tool.

11. A method comprising:

obtaining, by a workflow computing device, from a diagnostic scan tool comprising an adapter configured to couple the diagnostic scan tool to a vehicle computing network in a vehicle damaged in a collision event, via at least one first application programming interface (API) that enables data communication between the workflow computing device and the diagnostic scan tool, an identification of the vehicle and diagnostic data for the vehicle that requires one or more collision repair operations including replacement, reprogramming, recalibration, or repair of one or more systems or components of the vehicle that were damaged during the collision event;

retrieving, by the workflow computing device, from a third-party network device, via at least one second API that enables data communication between the workflow computing device and the third-party network device, specific repair procedure data for the vehicle based on the identification of the vehicle and the obtained diagnostic data and sending to the diagnostic scan tool for viewing on a display of the diagnostic scan tool via the at least one first API;

monitoring and recording in real time, by the workflow computing device, via the at least one first API, repair operations data received for the one or more collision repair operations on the one or more systems or components of the vehicle with the diagnostic scan tool when coupled to the vehicle computing network in the vehicle, wherein the recorded repair operations data includes recalibration data from one or more recalibrations performed on one or more electronic modules or one or more sensors associated with the vehicle and reprograming data from reprogramming of the one or more electronic modules or the one or more sensors of the vehicle associated with the one or more systems or components of the vehicle; and processing, by the workflow computing device, the repair operations data received from the diagnostic scan tool prior to and after the one or more collision repair operations to determine proof data proving that the one or more collision repair operations were completed on the vehicle; and transmitting, by the workflow computing device, the proof data to the third-party network device, via the at least one second API.

12. The method as set forth in claim 11, wherein the retrieving from the third-party network device the specific repair procedure data for the vehicle further comprises:

retrieving, by the workflow computing device, other repair procedure data for the one or more collision repair operations that includes prior annotated data, via at least one of the at least one first API and/or the at least one second API; and sending, by the workflow computing device, the other repair procedure data to the diagnostic scan tool for viewing on the display of the diagnostic scan tool, via the at least one first API.

13. The method as set forth in claim 11, further comprising:

resetting, via the at least one first API, one or more codes on the one or more electronic modules or the one or more sensors of the vehicle related to the one or more collision repair operations on the one or more systems or components of the vehicle with the diagnostic scan tool when coupled to the vehicle computing network in the vehicle.

14. The method as set forth in claim 11, wherein the identification of the vehicle further comprises at least vehicle identification number (VIN) data obtained by the diagnostic scan tool.

* * * * *

UNITED STATES PATENT AND TRADEMARK OFFICE
CERTIFICATE OF CORRECTION

| | | |
|---|---|---|
| PATENT NO. | : 11,462,061 B2 | Page 1 of 1 |
| APPLICATION NO. | : 16/676576 | |
| DATED | : October 4, 2022 | |
| INVENTOR(S) | : John Joseph Rozint | |

It is certified that error appears in the above-identified patent and that said Letters Patent is hereby corrected as shown below:

In the Claims

Column 23, Claim 1, Line 12 that reads "between the workflow computing device and with a third-party network device;" should read --between the workflow computing device and a third-party network device;--

Signed and Sealed this
First Day of August, 2023

Katherine Kelly Vidal
*Director of the United States Patent and Trademark Office*